(12) United States Patent  (10) Patent No.: US 7,818,688 B2
Narita et al.  (45) Date of Patent: Oct. 19, 2010

(54) INFORMATION BROWSING APPARATUS AND METHOD, PROGRAM AND RECORDING MEDIUM

(75) Inventors: Ken Narita, Tokyo (JP); Hitoshi Imai, Tokyo (JP); Tadashi Tsushima, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 283 days.

(21) Appl. No.: 11/553,669

(22) Filed: Oct. 27, 2006

(65) Prior Publication Data

US 2007/0106661 A1    May 10, 2007

(30) Foreign Application Priority Data

Oct. 28, 2005  (JP)  ............................. 2005-315004

(51) Int. Cl.
G06F 3/048  (2006.01)
(52) U.S. Cl. .................... 715/841; 715/787; 715/810; 715/811; 715/812; 715/825; 715/828; 715/853; 715/854; 709/228; 725/45; 725/46; 725/47; 725/52; 725/53; 725/60
(58) Field of Classification Search ................ 715/700, 715/810–812, 825, 828, 841, 853–854, 787; 709/228; 725/45, 46, 47, 52, 53, 60
See application file for complete search history.

(56) References Cited

U.S. PATENT DOCUMENTS

| | | | |
|---|---|---|---|
| 5,123,088 A | | 6/1992 | Kasahara et al. |
| 5,572,643 A | * | 11/1996 | Judson ........................ 709/218 |
| 5,805,167 A | * | 9/1998 | van Cruyningen .......... 715/808 |
| 5,861,885 A | | 1/1999 | Strasnick et al. |
| 6,038,566 A | * | 3/2000 | Tsai ................................. 1/1 |
| 6,121,969 A | | 9/2000 | Jain et al. |
| 6,285,367 B1 | * | 9/2001 | Abrams et al. .............. 715/854 |

(Continued)

FOREIGN PATENT DOCUMENTS

JP    2-168354    6/1990

(Continued)

OTHER PUBLICATIONS

English Language Abstract of JP 2004-363885.

(Continued)

*Primary Examiner*—Dennis-Doon Chow
*Assistant Examiner*—Shen Shiau
(74) *Attorney, Agent, or Firm*—Greenblum & Bernstein P.L.C.

(57) ABSTRACT

In a display device, items of information relating to specified information, which is displayed as the largest item, via a selected relation criterion, are displayed aligned on a selection axis, and items of information relating via other relation criteria are displayed aligned on non-selection axes. An item of information selected as the specified information can be sequentially changed in response to an input from up and down direction keys. The relation criteria for items of information displayed on the selection axis and the non-selection axes can be sequentially changed in response to an input from left and right direction keys. An information selection by the user is confirmed with present specified information by an input from a circle button, and a jump is made to a process according to the present specified information.

15 Claims, 11 Drawing Sheets

U.S. PATENT DOCUMENTS

| | | | |
|---|---|---|---|
| 6,463,428 B1* | 10/2002 | Lee et al. | 707/750 |
| 6,501,469 B1 | 12/2002 | MacPhail | |
| 6,662,177 B1* | 12/2003 | Martino et al. | 1/1 |
| 7,120,619 B2* | 10/2006 | Drucker et al. | 706/45 |
| 7,293,241 B1 | 11/2007 | Törnqvist et al. | |
| 7,587,681 B2 | 9/2009 | Kake et al. | |
| 7,761,812 B2* | 7/2010 | Ostojic et al. | 715/835 |
| 2002/0099700 A1* | 7/2002 | Li | 707/5 |
| 2003/0028885 A1* | 2/2003 | Wilcox et al. | 725/60 |
| 2003/0233460 A1* | 12/2003 | Drucker et al. | 709/228 |
| 2004/0215657 A1* | 10/2004 | Drucker et al. | 707/104.1 |
| 2005/0010599 A1 | 1/2005 | Kake et al. | |
| 2006/0020962 A1* | 1/2006 | Stark et al. | 725/32 |
| 2006/0026638 A1* | 2/2006 | Stark et al. | 725/38 |
| 2006/0031880 A1* | 2/2006 | Stark et al. | 725/45 |
| 2006/0047649 A1* | 3/2006 | Liang | 707/4 |
| 2006/0059143 A1* | 3/2006 | Palmon et al. | 707/5 |
| 2006/0101077 A1* | 5/2006 | Warner et al. | 707/104.1 |
| 2006/0265669 A1* | 11/2006 | Lee | 715/818 |
| 2007/0005581 A1* | 1/2007 | Arrouye et al. | 707/4 |
| 2008/0005687 A1 | 1/2008 | Törnqvist et al. | |

FOREIGN PATENT DOCUMENTS

| | | |
|---|---|---|
| JP | 8-139619 | 5/1996 |
| JP | 9-204286 | 8/1997 |
| JP | 11-282870 | 10/1999 |
| JP | 2000-76279 | 3/2000 |
| JP | 2002-543487 | 12/2002 |
| JP | 2004-363885 | 12/2004 |
| JP | 2005-10854 | 1/2005 |
| WO | 00/65429 | 11/2000 |

OTHER PUBLICATIONS

English Language Abstract of JP 11-282870.
U.S. Appl. No. 11/553,597 to Narita et al., filed Oct. 27, 2006.
Robertson et al, "Information Visualization Using 3D Interactive Animation", Communications of the Association for Computing Machinery, pp. 57-71, XP000355422.

* cited by examiner

| 10:00 TO 16:00 SUNDAY, DATE | | | | |
|---|---|---|---|---|
| | CHANNEL 1 | CHANNEL 2 | ------ | CHANNEL 12 |
| 10:00 | 00 DRAMA | 00 CARTOON | | 00 CARTOON |
| | | 30 CURRENT AFFAIRS SPECIAL | | 00 CARTOON |
| 11:00 | 00 TRAVEL INFORMATION | | | 00 NEWS |
| | 30 NEWS | 30 NEWS PRESENTER: ×× TARO | ------ | 45 FOREIGN SOCCER |
| 12:00 | 00 MUSIC PROGRAM | 00 COMEDY | | |
| | | 45 QUIZ | ------ | |

INFORMATION BROWSING APPARATUS AND METHOD, PROGRAM AND RECORDING MEDIUM

CROSS REFERENCE TO RELATED APPLICATION

The present disclosure relates to subject matter contained in Japanese Patent Application No. 2005-315004, filed on Oct. 28, 2005, the disclosure of which is expressly incorporated herein by reference in its entirety.

BACKGROUND OF THE INVENTION

1. Field of the Invention

The present invention relates to a technology for browsing information in order to locate information agreeable to a user's preference from among a plurality of items of information.

2. Description of Related Art

When selecting, for example, a TV program to be watched, a user changes a channel and, when a program of desired contents is displayed while watching, confirms a channel selection accordingly Otherwise, the user looks at a TV program guide, selects a desired program and, when a broadcast time of the program comes, changes a channel and watches the program. In a case of, for example, recording a program on video, the latter method is used.

In recent years, an electronic program guide (EPG) has been provided for selecting a program. As the electronic program guide, unlike an existing program guide of paper medium, there is one whose display method can be processed in order to compare different programs, and which can display detailed information on programs (for example, refer to Japanese Unexamined Patent Publication No. 2004-363885 (FIG. 2, Paragraph 0043, etc.)). By using the electronic program guide, it becomes easier for the user to locate a desired program from among a plurality of programs than in the existing program guide of paper medium.

Also, a search engine has been known as a technology for locating a user's desired item of information, which can also be applied to locating and selecting a TV program. In the search engine, in general, by inputting a keyword corresponding to information which the user intends to search for, information results corresponding to the keyword are provided in a list (for example, refer to Japanese Unexamined Patent Publication No. 11-282870 (Paragraph 0002, etc.)). The electronic program guide incorporating this search engine technology has been used to select a program.

Meanwhile, along with developments in broadcast communication technology in recent years, a range of choices of programs which a user can watch has been widened, ranging from the existing terrestrial broadcast programs to broadcast satellite (BS) broadcast programs, cable system (CS) broadcast programs, on-demand broadcast programs, and soon. Furthermore, information related to broadcast programs has been provided through various media by a media mix, such as, for example multimedia systems. This kind of trend is further spreading. Thus, there is increasing importance for a technology in which the user can locate desired information from among huge volumes of information.

In the existing program selection system using electronic program guides, even though search engines or other search functions are applied, eventually, contents of a program intended to be located have to be narrowed down. Further, it often happens when the user is watching an existing TV broadcast, a program which he or she has not positively selected, but which is broadcast by coincidence, becomes agreeable to his or her preference and induces interest.

However, as the number of kinds of information provided to the user increases, a range of an individual user's preference generally decreases, and therefore it becomes difficult to encounter this kind of coincidence. Also, when users accidentally obtain information agreeable to their preference, many users may want to obtain other information related to the displayed information. However, in case the accidentally obtained information is new to the user, it is more difficult for the user to locate other information related to the accidentally obtained information than it is to locate familiar information. However, heretofore, there have not been so many preferred technologies as a method for, in the event that information is new to the user, easily locating information related to the information.

SUMMARY OF THE INVENTION

The present invention is made in view of at least these problems. It is an object of the present invention to provide an information browsing apparatus and method, and a program and recording medium for them, which enable a user to easily locate information agreeable to a user's preference from among a plurality of items of information complicatedly related to each other, even though the user has not previously decided the information to be sought.

In order to achieve the object, according to a first aspect of the invention, there is provided an information browsing apparatus that allows the user to browse for information by sequentially displaying information selected in response to a user instruction from among a plurality of items of information, each of which relates to at least one other item of the plurality of items via at least one relation criteria. The apparatus includes a starting specified information setter that sets one of the first of items of information as specified information for starting information browsing. The apparatus further includes a specified information displayer that displays an item of information set as the specified information from among the plurality of items of information. The apparatus further includes an information selection determiner that determines whether to determine an information selection with the specified information in response to the user instruction. The apparatus further includes a relation criterion selector that, when the information selection is not determined by the information selection determiner, selects a relation criteria from the at least one relationship criteria that relate the specified information. The apparatus further includes a relevant information displayer that displays items of specified relevant information from among the plurality of items of information, the specified relevant information relating to the specified information via the selected relation criterion selected by the relation criterion selector. The apparatus further includes a specified relevant information selector that selects any one of the items of specified relevant information. The apparatus further includes a continuation specified information setter that sets the item of information selected by the specified relevant information selector as specified information for further browsing.

In the information browsing apparatus, the items of information relate to one another via respective different ones of any number of relation criteria. One of the items of information is first set as specified information. Any one of the relation criteria may be selected from among relation criteria that relate the specified information to other items of information, and items of specified relevant information, other than the specified information, relating to the specified information via the selected relation criterion are displayed on the display device. An item of information selected from among the displayed items of specified relevant information may be set as new specified information. Furthermore, any relation criterion may be newly selected from relation criteria that relate the newly set specified information to other items of information. When any item of information is selected from specified relevant information relating to the new specified information via the selected relation criterion, the selected item of information may be further set as the new specified information. In this way, by carrying out one information selection after another from among the relation criteria and items of specified relevant information, the specified information changes one item after another.

Here, the user can select a desired relation criterion from among the relation criteria that relate the specified information to other items of information. Thus, items of information relating to the specified information via the user's desired relation criterion are displayed as specified relevant information. Then, from among the items of specified relevant information relating to the present specified information via the user's desired relation criterion, the user can select any desired item of information as the new specified information. In this way, as relation criteria and items of information are selected one after another by user's own will, specified information selected and set subsequent to the specified information set at a prior point becomes information agreeable to a user's preference. By continuing this kind of selection, it becomes possible to reach a user's desired information. Also, as specified information is changed between items of information having a comparatively close relationship during a certain period of time, even though the user has not decided on specific information to be sought, it becomes possible to locate information agreeable to a user's preference.

The information browsing apparatus may still further include a list displayer that displays a list of items of information, from among a plurality of items of information, which may be set as the specified information for starting information browsing. The apparatus may still further include a listed information selector that selects a desired item of information from the list of items of information displayed by the list displayer in response to a user instruction. In this case, the starting specified information setter may set the item of information selected by the listed information selector as the specified information.

It becomes possible to more easily reach a user's desired information from the thus displayed list of items of information by selecting a desired item of information in response to a user's instruction as information to become first specified information for starting information browsing.

In the information browsing apparatus, the plurality of items of information may include items of information with which other items of information are related via only a single relation criterion. In this case, the relation criterion selector may select one of the relation criteria as the selected relation criterion in response to a user's instruction when at least two relation criteria relate the specified information displayed by the specified information displayer to other items of information. Otherwise, the relation criterion selector may select a single relation criterion as the selected relation criterion regardless of a user's instruction when only a single relation criterion relates the specified information displayed by the specified information displayer to other items of information.

In the information browsing apparatus, information that may become the next specified information may be limited to information relating to the specified information via the selected relation criterion. Here, in case there are at least two relation criterion that relate the specified information to other information, it becomes possible to select all items of information, which are related to the present specified information via any one of relation criteria, as the next specified information.

The information browsing apparatus may still further include a history storage that stores an item of information specifying a setting history of the specified information and a selection history of the selected relation criterion. The apparatus may further include a history condition restorer that, when the user issues an instruction to restore a history condition, causes the display to display an item of information from among the plurality of items of information according to the histories stored in the history storage.

The history storage may automatically store an item of information that specifies a setting history of the specified information and a selection history of the selected relation criterion each time the specified information is newly set, and each time the selected relation criterion is newly selected. Otherwise, the history storage stores an item of information that specifies a setting history of the specified information and a selection history of the selected relation criterion when the user issues an instruction to record the history. Or, both of the above methods may be combined.

In this case, even when the specified information becomes further away from the user's own desired information, by repeating the change of selection of specified information and a change of selection of a selected relation criterion, it is possible to restart a selection of the specified information and a selected relation criterion by returning to the previous selection condition of the specified information and selected relationship reference. Thus, a selection of user's desired information may be facilitated.

The information browsing apparatus may further include a selection processing system that, when it is determined that the information selection is determined with the specified information displayed by the information selection determiner, carries out a process set according to the specified information with which the information selection has been determined.

By configuring the information browsing apparatus in such a way that the process set by the specified information is carried out in response to an input from the information selection determiner, it becomes possible for the user to select a process which he or she wants to carry out, by visual perception.

The information browsing apparatus may still further include an information extractor that extracts an item of information from an information storage that stores the plurality of items of information, each of which is configured of a plurality of individual items of information corresponding to different respective ones of relation criteria. The relevant information displayer may cause the information extractor to extract an item of information in which only the individual items of information corresponding to the selected relation criterion differ from one another. The relevant information displayer may also display the extracted item of information as the specified relevant information.

The information browsing apparatus may still further include an information searcher that searches the information storage that stores relation criterion information sets, each of which is a set of items of information related to each other via different respective ones of relation criteria, for any one of the relation criterion information sets. In the information browsing apparatus, the relevant information displayer may cause the information searcher to search for a relation criterion information set corresponding to the selected relation criterion. The relevant information displayer may also display, from among items of information included in the searched relation criterion information set, an item of information other than the specified information as the specified relevant information.

The information browsing apparatus may still further include an information searcher that searches the information storage system that stores a plurality of items of information, each of which includes relation criterion information for specifying a relation criterion that relates the item of information to other items of information, for another item of information including the same relation criterion information. In the information browsing apparatus, the relevant information displayer may cause the information searcher to search for items of information including relation criterion information corresponding to the selected relation criterion. The relevant information displayer may also display, from among the searched items of information, an item of information other than the specified information, as the specified relevant information.

In the information browsing apparatus, the related information displayer may display the specified information in an order according to a degree of relationship to the specified information.

By causing the display to display the specified relevant information in an order according to a degree of relationship to the specified information, it becomes easier for a user to visually comprehend how to select new specified information in order to reach desired information from the present specified information.

In the information browsing apparatus, the specified information displayer may display, in a specified position thereon, an item of information set as the specified information at the present time. In the information browsing apparatus, the relevant information displayer may display the specified relevant information in a position thereon set based upon the specified position in which is displayed the item of information set as the specified information.

In this case, the relevant information displayer may cause the specified relevant information to be displayed smaller than the specified information.

By thus displaying the specified information in the specified position on the display, it becomes easier for the user to visually comprehend an item of information selected as the specified information at the present time. Also, by displaying the specified information larger in scale than the specified related information, it becomes easier for the user to visually perceive and comprehend an item of information selected as the specified information at the present time from the other items of information.

In the information browsing apparatus, the relevant information displayer may display, from among the specified relevant information, a predetermined number of items of information.

By thus limiting the number of items of specified relevant information displayed, even where there is a large number of items of specified relevant information relating to the specified information via the selected relation criterion, a size of the specified relevant information displayed is prevented from becoming too small. Also where the number of items of specified relevant information displayed is limited, as long as a fixed number of items of information are displayed, it presents no great impediment for user to visually perceive a relationship between the specified relevant information and the specified information.

The information browsing apparatus may still further include a non-specified relevant information displayer that displays, from among the plurality of items of information, non-specified relevant information that relates to the specified information via a relation criterion, other than the selected relation criterion, in a different position from the display position of the specified relevant information.

In this case, it becomes possible for the user to visually perceive both the other information relating to the specified information via another relation criterion, other than the selected relation criterion, and the items of information relating to the specified information via the selected relation criterion.

In order to achieve the above noted aim, according to a second aspect of the invention, there is provided an information browsing method executed in a computer device including an input device for inputting a user's instruction, a display for displaying information and a storage for storing data. The method allows a user to carry out information browsing according to instructions input on the input device by sequentially displaying information selected from among a plurality of items of information, each item relating to another item via at least one relation criteria. The method includes setting one of the plurality of items of information as specified information for starting information browsing. The method further includes storing data indicating the set specified information in the storage. The method still further includes displaying an item of information set as the specified information from among the plurality of items of information based on the data indicating the set specified information. The method still further includes receiving an information selection instruction from the input device to decide whether to determine an information selection with the specified information. The method still further includes, when the information selection is not determined, receiving a relation criteria selection instruction to select one relation criteria that relates the specified information to the other items of information. The method still further includes, displaying, from among the plurality of items of information, items of specified relevant information that relate to the specified information via the selected relation criterion. The method still further includes receiving a relevant item selection instruction, from the input device, to select one item of specified relevant information. The method still further includes newly setting the item of information selected from among the items of specified relevant information as specified information for further information browsing. The method still further includes updating data indicating the newly set specified information from data indicating the specified information stored. The method still further includes storing the updated data in the storage device.

In order to achieve the object, according to a third aspect of the invention, there is provided a program executed in a computer including an input device for inputting user instructions, a display for displaying information and a storage for storing data. The program allows a user to browse information according to the inputted user instructions by sequentially displaying information selected from among a plurality of items of information, each item relating to another item via each at least one relation criteria. The program causes the computer to set one of the plurality of items of information as specified information for starting information browsing. The program further causes the computer to store data indicating the set specified information in the storage. The program still further causes the computer to display an item of information set as the specified information at the present time on the display from among the plurality of items of information based on the data indicating the specified information stored in the storage. The program still further causes the computer to input an instruction from the input device to determine whether to determine an information selection with the specified information displayed on the display. The program still further causes the computer to, when the information selection is not determined, input an instruction to select a relation criteria that relates the specified information displayed on the display to the other items of information. The program still further causes the computer to display, from among the plurality of items of information, items of specified relevant information that relate to the specified information via the selected relation criterion on the display. The program still further causes the computer to input an instruction, from the input device, to select any one of the items of specified relevant information. The program still further causes the computer device to newly set the item of information selected from among the items of specified relevant information as specified information for further continuing information browsing. The program still further causes the computer to update data indicating the newly set specified information from the data indicating the stored specified information. The program still further causes the computer device to store the updated data in the storage device.

In order to achieve the object, according to a fourth aspect of the invention, there is provided a computer readable recording medium tangibly embodying a program that is to be executed in a computer device including an input device for inputting user instructions, a display for displaying information and a storage for storing data. The embodied program allows a user to browse information by sequentially displaying information selected from among a plurality of items of information, each item of information relating to another item of information via at least one relation criteria. The program causes the computer to set any one of the plurality of items of information as specified information for starting information browsing. The program further causes the computer to store data indicating the set specified information in the storage. The program still further causes the computer to display an item of information set as the specified information at the present time on the display from among the plurality of items of information based on the data indicating the specified information stored in the storage. The program still further causes the computer to input an instruction from the input device to decide whether to determine an information selection with the specified information. The program still further causes the computer to, when the information selection is not determined, input an instruction to select any one of the relation criteria that relate the specified information to the other items of information The program still further causes the computer to display, from among the plurality of items of information, items of specified relevant information that relate to the specified information via the selected relation criterion on the display. The program still further causes the computer to input an instruction, from the input device, to select any one of the items of specified relevant information. The program still further causes the computer to newly set the item of information selected from among the items of specified relevant information as specified information for further continuing information browsing. The program still further causes the computer to update data indicating the newly set specified information from the data indicating the specified information stored. The program still further causes the computer to store the updated data in the storage.

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout the several views of the drawings.

DESCRIPTION OF THE PREFERRED EMBODIMENTS

Hereafter, a description will be given of embodiments of the invention, with reference to the accompanying drawings. The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodiment in practice.

First Embodiment

Figure 1:
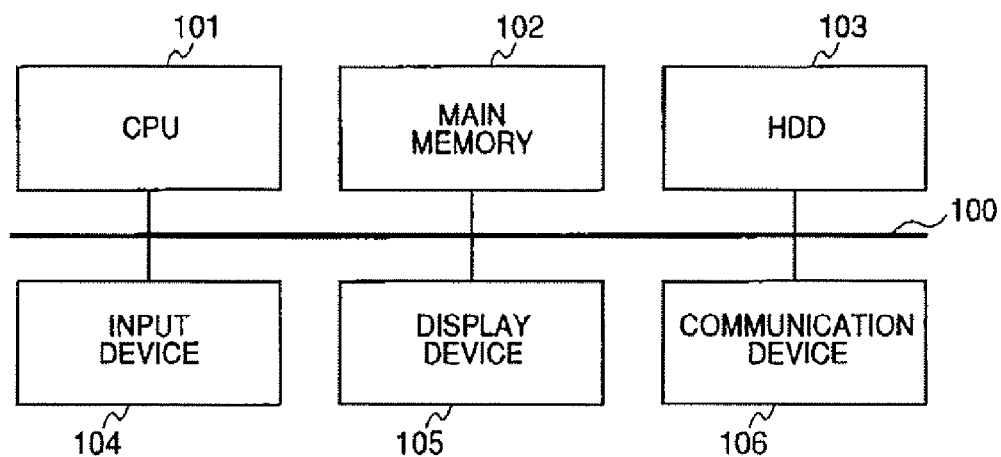
FIG. 1 is a block diagram showing a configuration of an information processing apparatus that executes a process according to a first embodiment of the invention.

FIG. 1 is a block diagram showing a configuration of an information processing apparatus according to this embodiment. As shown in the figure, the information processing apparatus in the example includes a central processing unit (CPU) 101, a main memory 102, a hard disk drive (HDD) 103, an input device 104, a display device 105 and a communication device 106. These are interconnected via a bus 100. The skilled artisan will appreciate that instead of bus 100, devices 101 to 106 may be coupled to each other via wired or wireless communication, or any combination thereof without departing from the scope and/or spirit of the invention.

The CPU 101 executes a program transferred to the main memory 102, and carries out a process such as, for example, a display of multiple items of related information to be described hereafter. The main memory 102 may be, but is not limited to a storage device such as, for example, a semiconductor memory, which provides a main storage space for the CPU 101. The HDD 103 is a storage device, which provides an auxiliary storage space for the CPU 101. Items of information to be selectively displayed on the display device 105, to be described hereafter, are stored in the HDD 103. The program toe executed by the CPU 101 is stored in the HDD 103 but, when executed, is transferred to the main memory 102 as necessary.

The input device 104 transmits an instruction from a user to the CPU 101. The input device 104 may be, but is not limited to, for example, a game pad for use in executing a computer game, a voice response interface device, a biometric interface device, or the like, which serves as an interface between the user and the CPU 101. The exemplary, non-limiting game pad may be configured in such a way as to include up, down, left and right direction keys, and four selection buttons, such as, for example, circle, X, square and triangle buttons. The circle button may be configured for carrying out an input to instruct a confirmation of specified information being displayed in a center of the display device 105. The X-button may be configured for carrying out an input to instruct a cancellation of the previous input from a direction key. The square button may be configured for carrying out an input to instruct a bookmarking of a present information display condition on the display device 105. The triangle button may be configured for carrying out an input to instruct a call up of a bookmark.

The display device 105 displays a variety of information according to a control of the CPU 101. The communication device 106 transmits and receives information to and from an external device via a communication network such as, for example, the Internet, a local area network (LAN), a wide area network (WAN), or the like, where the link to the network maybe wired, wireless, or a combination of wired and wireless as the skilled artisan will readily appreciate without departing from the scope and/or spirit of the invention. The information processing apparatus according to this embodiment does not necessarily include the communication device 106.

Next, a description will be given of exemplary, non-limiting items of information that may be selectively displayed on the display device 105 in this embodiment. The items of information to be selectively displayed on the display device 105 in this embodiment are stored in advance in the HDD 103 of the information processing apparatus in FIG. 1. Each item of information has, for example, three parameters and, in the event that one or more of the parameters differ in value, it is considered a different item of information. A non-limiting example of information having such a configuration is RGB data.

Figure 2:
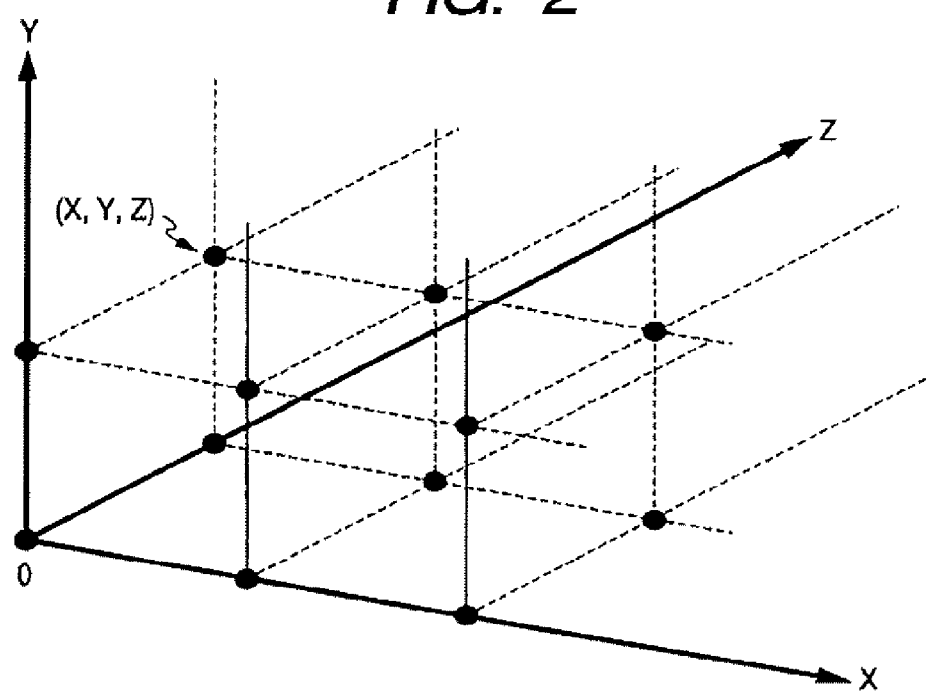
FIG. 2 is a diagram schematically showing a configuration of information selectively displayed on a display device according to the first embodiment of the invention.

FIG. 2 is a view schematically showing a configuration of the items of information to be selectively displayed on the display device 105 in this embodiment. In FIG. 2, small black circles indicate individual items of information. X, Y and Z spatial coordinates are allocated to corresponding parameters configuring each of the items of information, and thereby each of the items of information can be perceived as a point in a three-dimensional space, and has a mutual three-dimensional relationship.

Each of dimensions is defined as a relation criterion that relates one of the items of information to another, and therefore, in an x-dimensional relation criterion, the values of parameters corresponding to X differ while the values of parameters corresponding to Y and Z are the same. In a y-dimensional relation criterion, the values of parameters corresponding to Y differ while the values of parameters corresponding to Z and X are the same. In a z-dimensional relation criterion, the values of parameters corresponding to Z differ while the values of parameters corresponding to X are the same in value.

Also, the closer the values of the parameters corresponding to X, Y and Z are, the more similar in contents the individual items of information are. That is, when items of information having the same x-dimensional relation criterion are compared, the smaller a difference in value between the parameters corresponding to X, the closer in contents the items of information are. Items of information adjacent to each other in FIG. 2 have a slight difference between their contents, while items of information located in distant positions from each other in FIG. 2 have a great difference between their contents.

Figure 3:
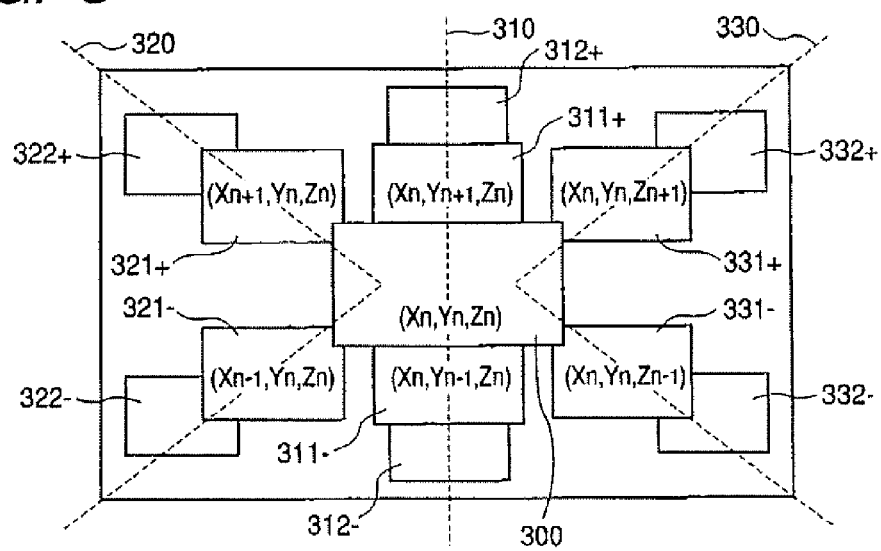
FIG. 3 is a diagram showing an example of a display mode of the information selectively displayed on the display device according to the first embodiment of the invention.

Next, a description will be given of a display mode of items of information on the display device 105 in this embodiment. FIG. 3 is a diagram showing an example of a display mode of the items of information to be selectively displayed on the display device 105 in this embodiment. In FIG. 3, the large item of information displayed in the center is specified as information 300. As described heretofore, the x, y or z-dimensional relation criterion is determined by which of the parameters corresponding to X, Y or Z included in the item of information selected as the specified information 300 differs in value, and thus one of the dimensional relation criteria is selected as a selected relation criterion.

The other items of information, other than the specified information, relating to the specified information 300 via the selected relation criterion are displayed aligned on a selection axis 310. Items of information 311+ and 311−, which are aligned on the selection axis 310, are respectively larger and smaller than the specified information 300 by one in a value of a parameter corresponding to the selected relation criterion, and items of information 312+ and 312− are respectively larger and smaller than the specified information 300 by two in a value of a parameter corresponding to the selected relation criterion. The items of information 311+ and 311−, which are closer in parameter value to the specified information 300, are displayed larger than the items of information 312+ and 312−. Also, of items of information aligned on the selection axis 310, items of information differing from the specified information 300 by three or more in a value of a parameter corresponding to the selected relation criterion are not displayed on the display device 105.

Other items of information relating to the specified information 300 by the other relation criteria, other than the selected relation criterion, are displayed aligned on a non-selection axis for each of the relation criteria. Items of information 321+ and 321−, which are aligned on a non-selection axis 320, are respectively larger and smaller than the specified information 300 by one in a value of a parameter corresponding to a relation criterion other than the selected relation criterion. Items of information 322+ and 322− are respectively larger and smaller than the specified information 300 by two in a value of a relation criterion corresponding to the selected relation criterion. The items of information 321+ and 321−, which are closer in parameter value to the specified information 300, are displayed larger than the items of information 322+ and 322−. Also, items of information aligned on the non-selection axis 320 differing from the specified information 300 by three or more in a value of a parameter, corresponding to a relation criterion other than the selected relation criterion, are not displayed on the display device 105. Items of information 331+, 331−, 332+ and 332−, which are aligned on a non-selection axis 330, are also similar in configuration to the items of information aligned on the non-selection axis 320.

The selection axis 310 and the non-selection axes 320 are not necessarily displayed on the display device 105, as long as they are recognized by the user. For processing purposes, it is not necessary that the selection axis 310 and the non-selection axes 320 and 330 are recognized by the CPU 101. That is, an axis on which items of information relating to the specified information 300, via the selected relation criterion, are apparently recognized to be aligned is the selection axis 310. Also, an axis on which items of information relating to the specified information 300, via each of the other relation criterion, other than the selected relation criterion, are apparently recognized to be aligned are the non-selection axes 320, 330.

In the event that the y-dimensional relation criterion becomes the selected relation criterion (in the case of, for example, FIG. 3), other items of information relating to the specified information 300, via the x-dimensional relation criterion, are displayed aligned on the non-selection axis 320. Also, other items of information relating to the specified information 300, via the z-dimensional relation criterion, are displayed as being aligned on the non-selection axis 330. In the event that the z-dimensional relation criterion becomes the selected relation criterion, other items of information related to the specified information 300, which are related by the y-dimensional relation criterion are displayed as being aligned on the non-selection axis 320. Also, in this case, other items of information relating to the specified information 300 via the x-dimensional relation criterion are displayed as being aligned on the non-selection axis 330. In the case where the x-dimensional relation criterion becomes the selected relation criterion, other items of information relating to the specified information 300 via the z-dimensional relation criterion are displayed as being aligned on the non-selection axis 320. Also, in this case, other items of information relating to the specified information 300 via the y-dimensional relation criterion are displayed as being aligned on the non-selection axis 330.

The user can, according to an up, down, left or right operation of the direction keys of the input device 104, change a selection of the selected relation criterion to another relation criterion relating to the specified information 300. For example, as shown in FIG. 3, in the event that values of parameters of the specified information 300 are (Xn, Yn, Zn) and the y-dimensional relation criterion is the selected relation criterion, besides the specified information 300, items of information (Xn, Yn+2, Zn), (Xn, Yn+1, Zn), (Xn, Yn−1, Zn) and (Xn, Yn−2, Zn) differing in values of parameters in the y-dimension are displayed aligned on the selection axis 310 as the items of information 312+, 311+, 311− and 312−. As shown in FIG. 3, items of information differing in parameter value in the x-dimension and the z-dimension, which are different relation criteria, are displayed aligned on the non-selection axes 320 and 330, respectively.

At this point, when the left direction key is operated, in accordance with the left direction, the selected relation criterion is changed from the y-dimensional relation criterion to the z-dimensional relation criterion, which is a relation criterion of the non-selection axis 330. Relation criteria of the non-selection axes 320 and 330 are also changed to the x-dimension and the y-dimension, respectively.

Furthermore, when an operation of the left direction key is carried out, the selected relation criterion is changed from the z-dimensional relation criterion to the x-dimensional relation criterion. Relation criteria of the non-selection axes 320 and 330 are also changed to the z-dimension and the y-dimension, respectively. Also in the event that the right direction key of the input device 104 is operated, relation criteria of the selection axis 310 and the non-selection axes 320 and 330 are changed in reverse order to that just described above with respect to the left direction key. By an input from the left and right direction keys, the selected relation criterion of the selection axis 310 and the relation criteria of the non-selection axes 320 and 330 are changed, but the specified information 300 is not changed.

Also, the user can, according to an operation of the up and down direction keys of the input device 104, change the specified information 300 to another item of information displayed in a position adjacent to the specified information 300 on the selection axis 310. For example, when an operation of the down direction key is carried out in FIG. 3, in accordance with the down direction, the specified information 300 is changed from an item of information having (Xn, Yn, Zn) as its parameter values to an item of information which, being located in an upper position on the selection axis 310, has (Xn, Yn+1, Zn) as its parameter values. According to the change of the specified information 300, each of the other items of information displayed on the selection axis 310 is displayed as being shifted upward or downward by one according to the relevant input direction.

Also, according to the change of the specified information 300, the items of information displayed aligned on the non-selection axes 320 and 330 are changed to items of information corresponding to parameter values of the new specified information 300. For example, in the event that the specified information 300 is changed to (Xn, Yn+1, Zn) from the condition shown in exemplary FIG. 3, besides the specified information 300, items of information (Xn+2, Yn+1, Zn), (Xn+1, Yn+1, Zn), (Xn−1, Yn+1, Zn) and (Xn−2, Yn+1, Zn) differing in x-dimensional parameter value are displayed aligned on the non-selection axis 320 as items of information 322+, 321+, 321− and 322−, respectively. The same also applies to items of information 332+, 331+, 331− and 332− on the non-selection axis 330.

As described heretofore, an item of information selected as the specified information 300 is sequentially changed by operating the up and down direction keys of the input device 104, while the relation criteria of the items of information displayed on the selection axis 310 and the non-selection axes 320 and 330 is sequentially changed by an operation of the left and right direction keys of the input device 104. Each time the selection of the specified information 300 or selected relation criterion is changed, a history of the changes is recorded in the main memory 102. Also, a selection condition of the specified information 300 and selected relation criterion at any time is bookmarked, thereby enabling a restoration at any time of the selection condition and the selected relation criterion.

Figure 4A:
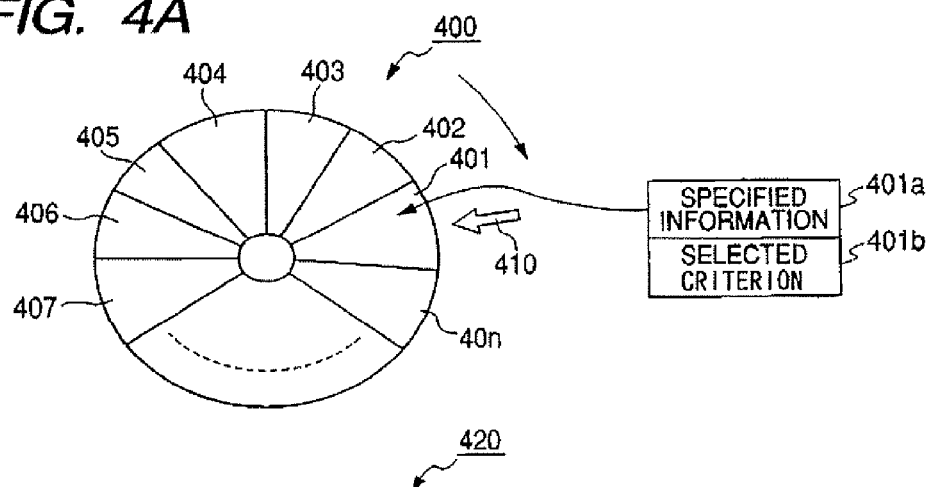
FIGS. 4A and 4B are diagrams showing a configuration of a history buffer provided in a main memory and a configuration of a bookmark buffer.

FIG. 4A is a diagram showing a configuration of a history buffer provided in the main memory 102. The history buffer 400 is configured of a ring buffer formed of a plurality of history storage areas 401 to 40n. The history storage area 401 includes a specified information area 401a and a selected criterion area 401b. The history storage areas 402 to 40n also have the same configuration as the history storage area 401. Also, a pointer 410 indicates a history storage area (such as, for example, the history storage area 401 in FIG. 4A) which records a selection condition of the specified information 300 and the selected relation criterion at the present time.

When the user actuates an up, down, left or right direction key, thereby inputting a corresponding up, down, left or right direction instruction, of the input device 104, the display mode of the display device 105 is changed according to the input direction instruction. Specifically, in the event of an input from the up and down direction keys, the specified information 300 is changed while, in the event of an input from the left and right direction keys, the selected relation criterion is changed. Each time the display mode is changed, an item of information indicating the specified information 300 and the selected relation criterion in the new display mode is stored in a history storage area subsequent to the history storage area indicated by the pointer at the present time, and the pointer 410 is moved to the subsequent storage area.

When the user actuates an X-button of the input device 104, the pointer 410 returns to a history storage area immediately before the history storage area indicated by the pointer 410 in the history buffer 400, and the previous input instruction from a direction key is cancelled. In this way, the specified information and the selected relation criterion stored in the history storage area to which the pointer 410 has returned are read, and a display mode, for which history is restored, is displayed on the display device 105. The user, by repeating an actuation of the X-button, can trace input histories of the up and down direction keys of the input device 104, one by one.

Figure 4B:
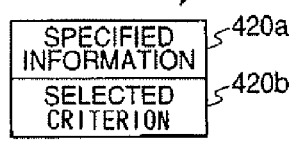

FIG. 4B is a diagram showing a configuration of a bookmark buffer provided in the main memory 102. The bookmark buffer 420 includes a specified information area 420a and a selected criterion area 420b. When the user actuates the square button of the input device 104, an item of information selected as the specified information 300 at that time is recorded in the specified information area 420a, and a relation criterion selected as the selected relation criterion is recorded in the selected criterion area 420b. In the event that, prior to an operation of the square button, there is data is registered in the bookmark buffer 420 in response to a prior operation of the square button, the registered data is caused to be overwritten by the subsequent actuation of the square button.

When the user actuates the triangle button of the input device 104, in accordance with the specified information stored in the specified information area 420a and the selection condition of the selected relation criterion stored in the selected criterion area 420b, the display mode, when the user actuates the square button of the input device 104, is restored and displayed on the display device 105. The specified information 300 and selected relation criterion restored at this point are also recorded in the subsequent history storage area of the history buffer 400 as new history data.

In the event that no data are registered in the specified information area 420a or selected criterion area 420b of the bookmark buffer 420 prior to the actuation of the triangle button (for example, no bookmarking has been carried out by an instruction from the square button), the display mode of the display device 105 is not changed by an actuation of the triangle button.

Figure 5:
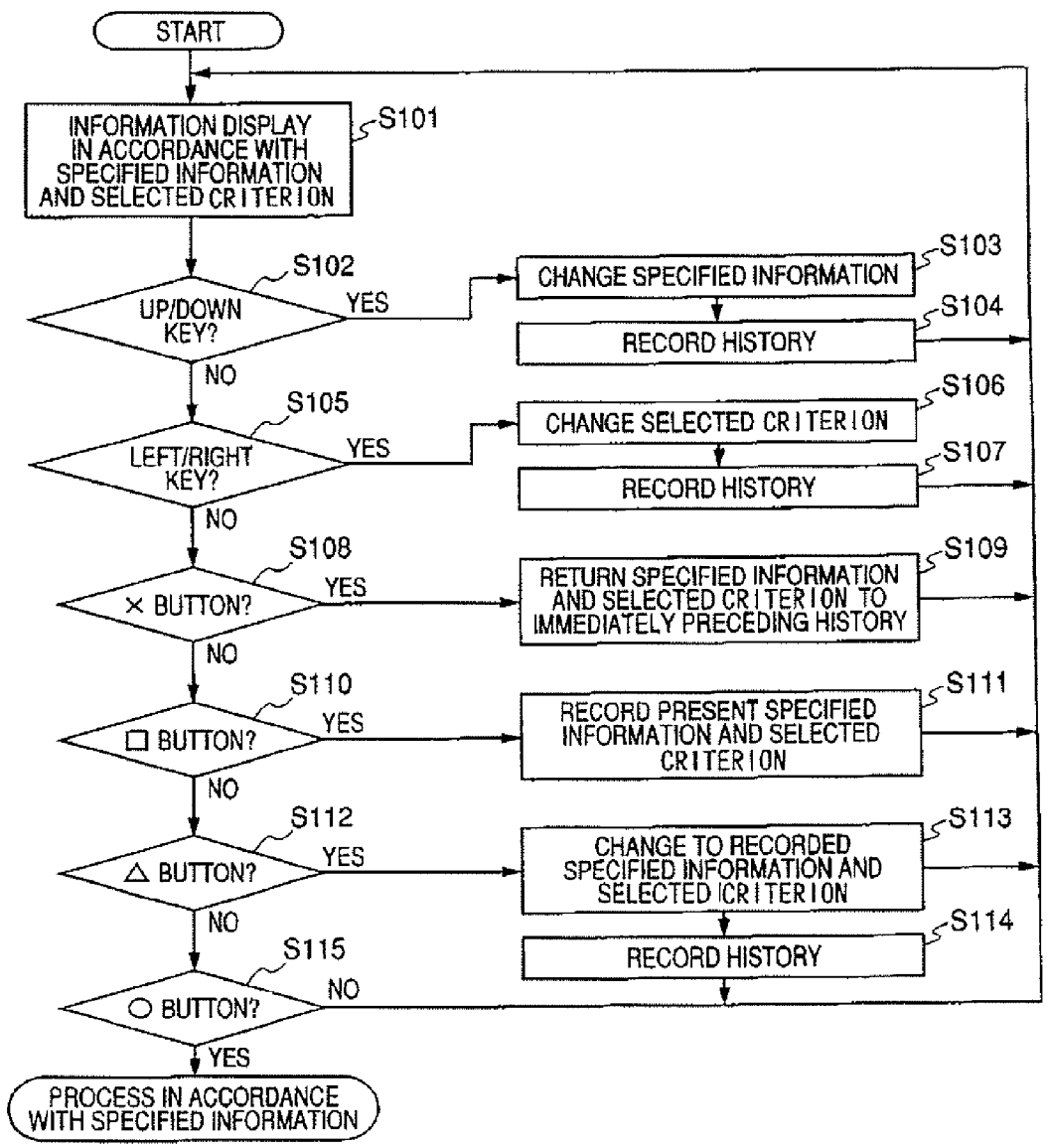
FIG. 5 is a flowchart showing a process according to the first embodiment of the invention.

Hereafter, a description will be given of a process executed in the information processing apparatus according to this embodiment. FIG. 5 is a flowchart showing an exemplary, non-limiting process in this embodiment. Although other processing steps, other than those shown here, are carried out in the information processing apparatus, the processing steps minimally necessary for describing the invention are shown here.

First, in the information processing apparatus, the CPU 101 reads the specified information stored in the specified information area 401a and the selected relation criterion stored in the selected criterion area 401b, from the history storage area indicated by the pointer 410 among the plurality of history storage areas 401 to 40n of the history buffer 400 (FIG. 4A) provided in the main memory 102. Then, the CPU 101 displays items of information on the display device 105 in accordance with the specified information and selected relation criterion (step S101) that was read.

Next, the CPU 101 determines whether or not the up or down direction keys of the input device 104 are actuated (step S102). If there is an actuation of the up or down direction keys ("Yes" at step S102), the CPU 101, in accordance with the direction input from the direction keys, changes another item of information related to the specified information 300 by the selected relation criterion at the present time to new specified information 300 (step S103). Next, the CPU 101 stores the changed selection condition of the specified information 300 and selected relation criterion in a history storage area subsequent to the history storage area indicated by the pointer 410 in the history buffer 400, and moves the pointer 410 to the subsequent history storage area (step S104). Then, the CPU 101 returns to the process in step S101.

If there is no actuation of the up or down direction keys ("No" at step S102), the CPU 101 determines whether there is an actuation of the left or right direction keys of the input device 104 (step S105). If there is an actuation of the left or right direction keys ("Yes" at step S105), the CPU 101, in accordance with the direction input from the direction keys, changes the selected relation criterion to another relation criterion with respect to the specified information 300 at the present time (step S106). Next, the CPU 101 stores the changed selection condition of the specified information 300 and selected relation criterion in a history storage area subsequent to the history storage area indicated by the pointer 410 in the history buffer 400, and moves the pointer 410 to the subsequent history storage area (step S107). Then, the CPU 101 returns to the process in step S101.

If there is no actuation of the left or right direction keys ("No" at step S105), the CPU 101 determines whether there is an actuation of the X-button of the input device 104 (step S108). If there is an actuation of the X-button, the CPU 101 returns the pointer 410 to a history storage area immediately before the history storage area indicated by the pointer 410 in the history buffer 400 provided in the main memory 102, thereby returning the display mode of the display device 105 to the previous condition in history (step S109). Then, the CPU 101 returns to the process in step S101.

If there is no actuation of the X-button ("No" at step S108), the CPU 101 determines whether there is an actuation of the square button of the input device 104 (step S110). If there is an actuation of the square button ("Yes" at step S110), the CPU 101 stores an item of information selected as the specified information 300 at that instant in time in the specified information area 420a of the bookmark buffer 420 provided in the main memory 102. At the same time, the CPU 101 stores a relation criterion selected as the selected relation criterion at that instant in time in the selected criterion area 420b (step S111). Then, the CPU 101 returns to the process in step S101.

If there is no actuation of the square button ("No" at step S110), the CPU 101 determines whether there is an actuation of the triangle button of the input device 104 (step S112). If there is an actuation of the triangle button ("Yes" at step S112), the CPU 101 reads specified information stored in the specified information area 420a of the bookmark buffer 420 and a selected relation criterion stored in the selected criterion area 420b, and carries out a change to display information corresponding to the read specified information and selected relation criterion (step S113). Next, the CPU 101 stores the changed selection condition of the specified information 300 and selected relation criterion in a history storage area subsequent to the history storage area indicated by the pointer 410 in the history buffer 400, and moves the pointer 410 to the subsequent history storage area (step S114). Then, the CPU 101 returns to the process in step S101.

If there is no actuation of the triangle button ("No" at step S112), the CPU 101 determines whether there is an actuation of the circle button of the input device 104 (step S115). If there is an actuation of the circle button ("Yes" at step S115), the CPU 101 carries out a process according to the specified information 300 at that instant in time. As this process has no direct relationship to the invention, a detailed description will be omitted. If there is no actuation of the circle button ("No" at step S115), the CPU 101 returns to the process in step S101.

Hereafter, a description will be given, based on a specific example, of a change in a display mode of the information displayed on the display device 105 in this embodiment. FIGS. 6A to 6H are diagrams specifically showing a change in a display mode of the information displayed on the display device 105 in this embodiment.

Figure 6A:
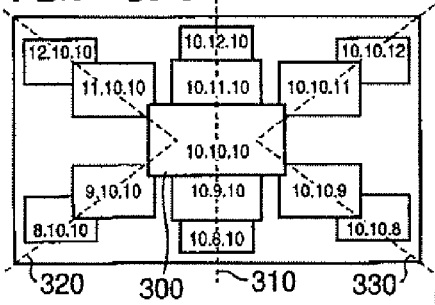
FIGS. 6A to 6H are diagrams specifically showing a change in the display mode of the information according to the first embodiment of the invention.

As shown in FIG. 6A, the display device 105 displays 13 items of information each having values of three parameters (X, Y, Z). In FIG. 6A, the values of the parameters (X, Y, Z) of the specified information 300 displayed in the center of the display device 105 are (10, 10, 10), and the selected relation criterion is the y-dimensional relation criterion.

At this point, the items of information aligned on the selection axis 310, including the specified information 300, are, in order from the top, (10, 12, 10), (10, 11, 10), (10, 10, 10), (10, 9, 10) and (10, 8, 10). The items of information aligned on the non-selection axis 320 are, in order from the top, (12, 10, 10), (11, 10, 10), (10, 10, 10), (9, 10, 10) and (8, 10, 10). Items of information aligned on the non-selection axis 330 are, in order from the top, (10, 10, 12), (10, 10, 11), (10, 10, 10), (10, 10, 9) and (10, 10, 8).

Figure 6B:
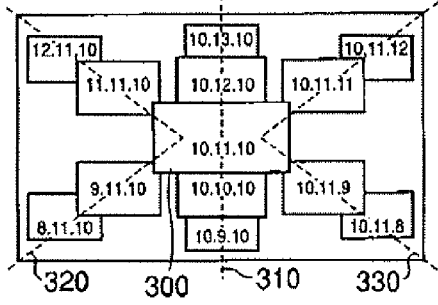

When the down direction key is actuated on the input device 104 in a condition in which FIG. 6A is displayed on the display device 105, the display mode changes to that as shown in FIG. 6B. In FIG. 6B, the items of information aligned on the selection axis 310 are moved down by one, and the specified information 300 becomes (10, 11, 10), along with which the items of information on the non-selection axes 320 and 330 also change At this point, the items of information aligned on the selection axis 310, including the specified information 300, are, in order from the top, (10, 13, 10), (10, 12, 10), (10, 11, 10), (10, 10, 10) and (10, 9, 10). The items of information aligned on the non-selection axis 320 are, in order from the top, (12, 11, 10), (11, 11, 10), (10, 11, 10), (9, 11, 10) and (8, 11, 10). The items of information aligned on the non-selection axis 330 are, in order from the top, (10, 11, 12), (10, 11, 11), (10, 11, 10), (10, 11, 9) and (10, 11, 8).

Figure 6C:
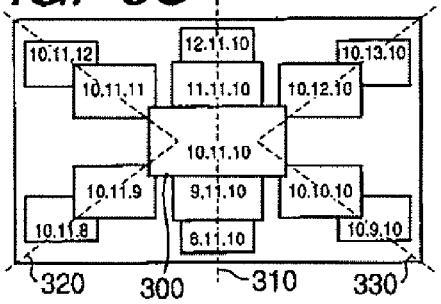

Next, when the right direction key is actuated on the input device 104 in a condition in which FIG. 6B is displayed on the display device 105, the display mode changes to that as shown in FIG. 6C. In FIG. 6C, although the specified information 300 remains (10, 11, 10), the selected relation criterion of the selection axis 310 becomes the x-dimensional relation criterion, and the relation criteria of the non-selection axes 320 and 330 become the z-dimensional and y-dimensional relation criteria, respectively.

At this point, items of information aligned on the selection axis 310, including the specified information 300, are, in order from the top, (12, 11, 10), (11, 11, 10), (10, 11, 10), (9, 11, 10) and (8, 11, 10). The items of information aligned on the non-selection axis 320 are, in order from the top, (10, 11, 12), (10, 11, 11), (10, 11, 10), (10, 11, 9) and (10, 11, 8). The items of information aligned on the non-selection axis 330 are, in order from the top, (10, 13, 10), (10, 12, 10), (10, 11, 10), (10, 10, 10) and (10, 9, 10).

Figure 6D:
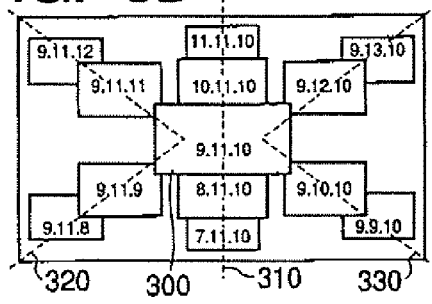

Next, when the up direction key is actuated on the input device 104 in a condition in which FIG. 6C is displayed on the display device 105, the display mode changes to that as shown in FIG. 6D. In FIG. 6D, the items of information aligned on the selection axis 310 are moved up by one, and the specified information 300 becomes (9, 11, 10), along with which the items of information on the selection axes 320 and 330 also change.

At this point, items of information aligned on the selection axis 310, including the specified information 300, are, in order from the top, (11, 11, 10), (10, 11, 10), (9, 11, 10), (8, 11, 10) and (7, 11, 10). The items of information aligned on the non-selection axis 320 are, in order from the top, (9, 11, 12), (9, 11, 11), (9, 11, 10), (9, 11, 9) and (9, 11, 8). the items of information aligned on the non-selection axis 330 are, in order from the top, (9, 13, 10), (9, 12, 10), (9, 11, 10), (9, 10, 10) and (9, 9, 10).

Figure 6E:
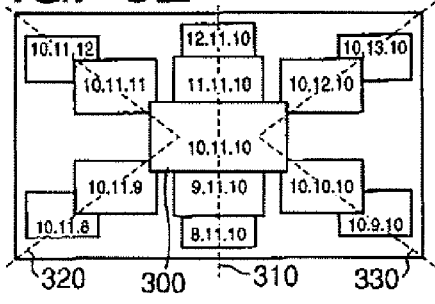

Next, when the X-button is actuated on the input device 104 in a condition in which FIG. 6D is displayed on the display device 105, the previous history is retrieved and the same display mode as that in FIG. 6C is displayed on the display device 105, as shown in FIG. 6E.

Figure 6F:
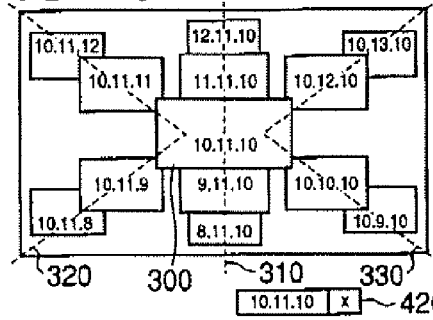

Next, when the square button is actuated on the input device 104 when FIG. 6E is displayed on the display device 105, as shown in FIG. 6F, the display mode does not change from the condition shown in FIG. 6E, but the information (10, 11, 10) selected as the specified information 300 at the time the square button is actuated and the x-dimensional relation criterion selected as the selected relation criterion are recorded in the bookmark buffer 420.

Figure 6G:
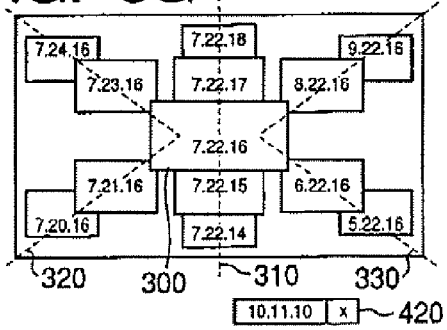
Figure 6H:
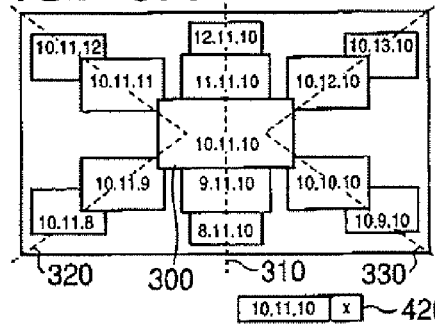

After that, a display mode as that shown in FIG. 6G may be displayed in response to an actuation of the other buttons, other than the square button of the input device 104. When the triangle button is actuated on the input device 104 when FIG. 6G is displayed on the display device 105, the information (10, 11, 10) and x-dimensional relation criterion stored in the bookmark buffer 420 becomes the new specified information 300 and selected relation criterion. Accordingly, as shown in FIG. 6H, the display mode when the user actuated the square button of the input device 104, that is, the display mode shown in FIG. 6F, is restored on the display device 105.

As described heretofore, in the first embodiment, the specified information 300 is displayed in the center of the display device 105. Other items of information relating to this specified information 300 in accordance with the values of three parameters X, Y and Z are displayed in other positions, other than the center, on the display device 105. At this point, the specified information 300 is related to other items of information by three relation criteria X, Y and Z, and one relation criterion is selected as the selected relation criterion. Other items of information relating to the specified information 300 via the selected relation criterion are displayed aligned on the selection axis 310. In this way, the user can visually perceive other items of information relating to the specified information 300 via the selected relation criterion with the focus on the specified information 300 displayed on the display device 105.

Also, not only are other items of information relating to the specified information 300 by way of selected relation criterion displayed, but also other items of information related to the specified information 300 by other relation criteria, other than the selected relation criterion, are displayed on the display device 105 as being aligned on the non-selection axes 320 and 330 for each relation criterion. Thus, the other items of information relating to the specified information 300 via other relation criteria, other than the selected relation criterion, can also be visually perceived simultaneously with the items of information relating to the specified information 300 via the selected relation criterion.

At this point, if an actuation of the up or down keys of the input device 104 is carried out, the specified information 300 can be changed to another item of information which is displayed in a position adjacent to the specified information 300 on the selection axis 310 according to the input direction. For example, on the selection axis 310 displayed on the display device 105, in order to change the specified information 300 to the information 311+ displayed in an upper position (as shown in FIG. 3), the down direction key of the input device 104 may be operated. Also, in order to change the specified information 300 to the information 311− displayed in a lower position, the up direction key of the input device 104 may be operated. By repeatedly carrying out this kind of input from the up and down direction keys, items of information related by the same relation criterion can be sequentially displayed in the center of the display device 105 as the specified information 300.

When the specified information 300 is changed by an input from the up and down direction keys, items of information displayed aligned on the selection axes 320 and 330 also change in accordance with the new specified information 300. That is, when the up or down direction keys of the input device 104 are actuated, it becomes possible to change the specified information 300 and to change other items of information aligned on the non-selection axes 320 and 330 by relation criteria according to the changed specified information 300. For at least this reason, when the specified information 300 is changed, the user can easily visually perceive items of information related to the new specified information 300.

Also, should the user become interested in other items of information displayed on the non-selection axes 320 and 330, or the like, by actuating the left or right direction keys of the input device 104, it becomes possible to change a relation criterion, which has not been selected as the selected relation criterion, to the selected relation criterion. For example, in order to change the selected relation criterion to a relation criterion of the non-selection axis 330 displayed in a right position relative to the selection axis 310 on the display device 105 (as shown, for example, in FIG. 3), the left direction key of the input device 104 maybe operated. Also, in order to change the selected relation criterion to a relation criterion of the non-selection axis 320 displayed in a left position relative to the selection axis 310, the right direction key of the input device 104 may be operated. An item of information that may next be specified as the information 300 is limited to items of information relating to the specified information 300 via the selected relation criterion. However, the user can select an item of information relating to the present specified information 300 via any relation criterion as the next specified information 300 by making the selected relation criterion changeable as described above.

Then, by combining an actuation of the up or down direction keys of the input device 104 with an actuation of the left or right direction keys of the input device 104, the user can reach a desired item of information by a visual comparison from an item of information which has been made the specified information 300 at a certain time. By sequentially changing the specified information 300 and the selected relation criterion by an input from the input device 104 in this way, it becomes possible to easily reach a desired item of information from among a plurality of items of information intricately related to each other, by visual perception. In this way, even from among the plurality of items of information intricately related to each other, as the specified information 300 is temporarily changed between comparatively closely related items of information, even though the user has not previously decided a target item of information, it is possible to locate an item of information in accordance with a user's taste.

Also, on the display device 105, as the specified information 300 is displayed in the center as being larger than the other items of information, an item of information selected as the specified information 300 at the present time becomes easier for the user to visually comprehend than the other items of information.

Meanwhile, of the items of information 312+, 311+, 311− and 312− displayed on the selection axis 310 besides the specified information 300 (as shown, for example, in FIG. 3), the closer to the specified information 300 in values of parameters corresponding to the selected relation criterion, (the more similar in contents to the specified information 300), the closer an item of information is displayed to the specified information 300. Also, the items of information 311+ and 311−, which are adjacent to the specified information 300, are displayed larger than the items of information 312+ and 312− not adjoining the specified information 300. Also, the same applies to items of information displayed on the non-selection axes 320 and 330.

In this way, by displaying an item of information, which is more similar in contents to the specified information 300, closer to the specified information 300, it becomes easier for the user to comprehend how to select a next specified information 300 to reach a desired item of information. Also, by displaying an item of information that is adjacent to the specified information 300 larger than an item of information that is not adjacent, another item of information, which can be selected as specified information 300 subsequently to the present specified information 300 by an input from the input device 104, becomes easier for the user to visually perceive, and it becomes possible to more easily carry out an information selection.

Also, the number of items of information displayed on any of the selection axis 310 and the non-selection axes 320 and 330 is limited, apart from the specified information 300. For at least this reason, even though there are a large number of items of information relating to the specified information 300 via each of the relation criteria, a display size of other items of information, other than the specified information 300 on the display device 105, is prevented from being too small. Also, even though the number of items of information that are displayed aligned on the selection axis 310 and the non-selection axes 320 and 330 is limited, as long as a fixed number of items of information are displayed, the user is not hindered from visually perceiving a relationship between the other items of information and the specified information 300.

Meanwhile, each time the specified information 300 and/or the selected relation criterion is changed, its selection condition history is recorded in the history storage areas 401 to 40$n$ (shown, for example, in FIG. 4A). When the user actuates the X-button of the input device 104, the selection condition of the specified information and the selected relation criterion stored in a history storage area as a history immediately previous to the present display mode is read. A display mode, in which the previous history has been restored, is displayed on the display device 105. With such a configuration, even when the present specified information 300 is thought to be farther away from a user's desired item of information, after a previous display mode is reproduced, the specified information 300 and the selected relation criterion can be selected over again. Thus, a selection of a user's desired item of information may be facilitated.

Also, when the user actuates the square button of the input device 104, the selection condition of the specified information 300 and selected relation criterion at the time of actuation is recorded. When the user later actuates the triangle button, the selection condition, of the specified information and the selected relation criterion, stored in the bookmark buffer 420 is read, and the display mode when the user actuated the square button is restored on the display device 105. When the user becomes curious about a selection condition of the specified information 300 and selected relation criterion at a certain point, it is possible to bookmark the point and restore the bookmarked display mode at any later time. With such a configuration, even when the present specified information 300 is thought to be farther away from a user's desired item of information, after the bookmarked display mode is reproduced, the specified information 300 and the selected relation criterion can be selected over again. Thus, a selection of a user's desired item of information may be facilitated.

Meanwhile, as the display device 105 generally displays an image in a planar configuration, a plurality of items of information can be only two-dimensionally arranged on the display device 105. With a three-dimensional arrangement of items of information, it is possible to project an information relationship onto a two-dimensional plane by means of a perspective transformation or the like, but a tridirectional input is required. In contrast, in this embodiment, although the input device 104 includes only up, down, left and right two-dimensional direction keys, by selecting the selected relation criterion by an input from the left and right direction keys and selecting the specified information 300 by an input from the up and down direction keys, the user can use three-dimensional relation criteria to visually perceive a relationship of each item of information and easily select a desired item of information from among a plurality of items of information.

Furthermore, when the user actuates the circle button of the input device 104, a process according to an item of information which is made the specified information 300 is carried out. In this way, a process set according to the specified information 300 is carried out by an actuation of the circle button, the user can visually perceive and select a process which he or she wants to carry out.

Second Embodiment

A configuration of an information processing apparatus applied to this embodiment is the same as that of the information processing apparatus shown in the first embodiment. In this embodiment, a configuration of the information selectively displayed on the display device 105 in response to an input from the input device differs from that of the first embodiment. Also, because of this difference in the information configuration, a number of axes on which the information is displayed, which is based on specified information displayed in the center of the display device 105, varies according to the specified information.

Figure 7:
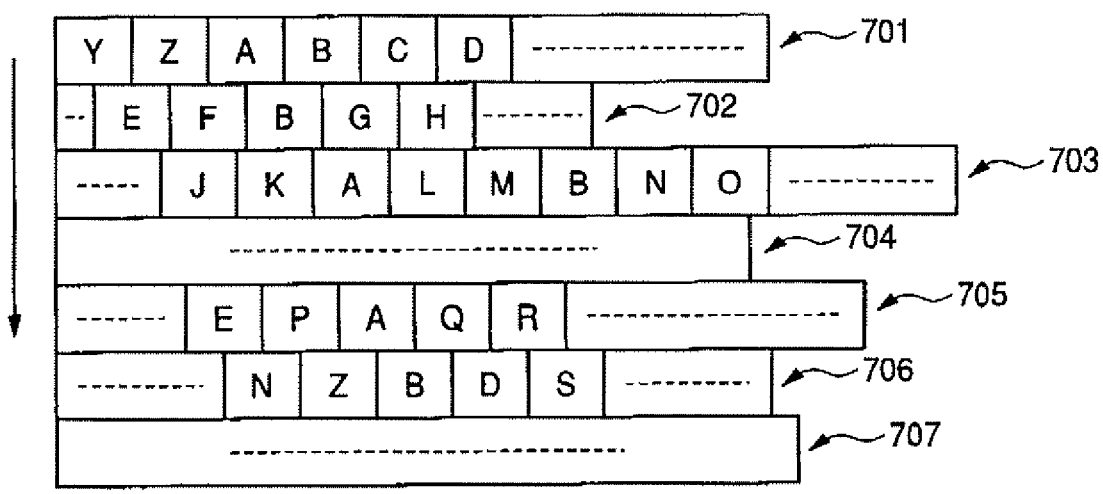
FIG. 7 is a diagram schematically showing a configuration of information selectively displayed on a display device according to a second embodiment of the invention.

FIG. 7 is a diagram schematically showing a configuration of information selectively displayed on the display device 105 in this embodiment, At this point, items of information relating to each other via identical relation criteria are grouped together, forming information packages 701 to 707 for each relation criterion. The information packages 701 to 707 are stored in advance in the HDD 103 of the non-limiting exemplary information processing apparatus shown in FIG. 1. In one information package, items of information having close similarity in their contents when considered with regard to the relevant relation criterion are recorded adjacent to each other. Each of the items of information in the information packages 701 to 707 is not necessarily an information content, but may instead be a pointer to an item of information having content.

Figure 8A:
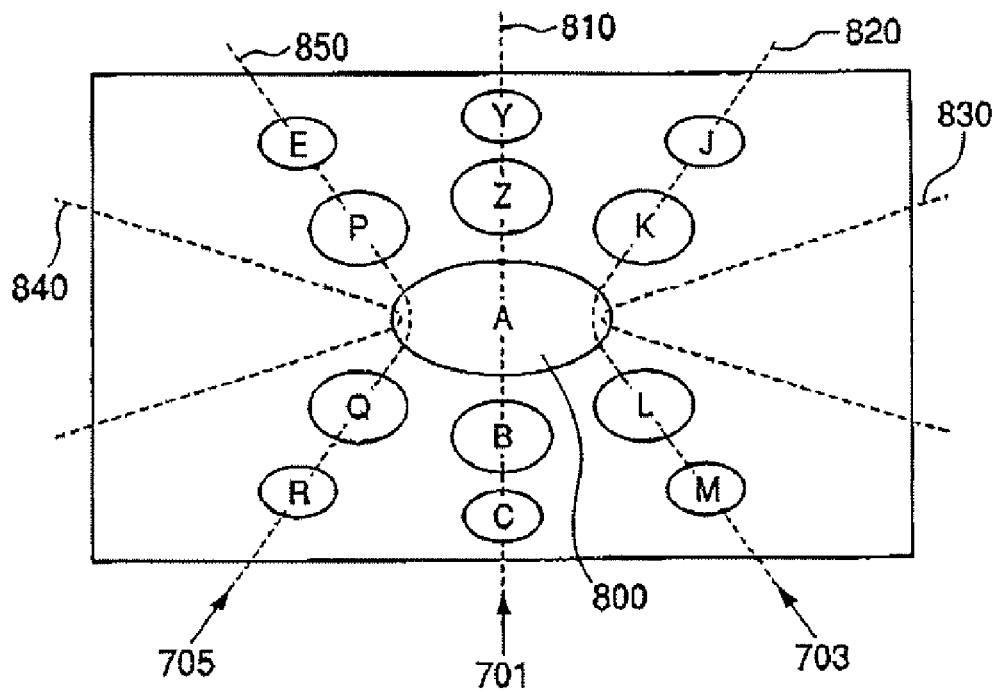
FIGS. 8A and 8B are diagrams showing an example of a display mode of the information selectively displayed on the display device according to the second embodiment of the invention.
Figure 8B:
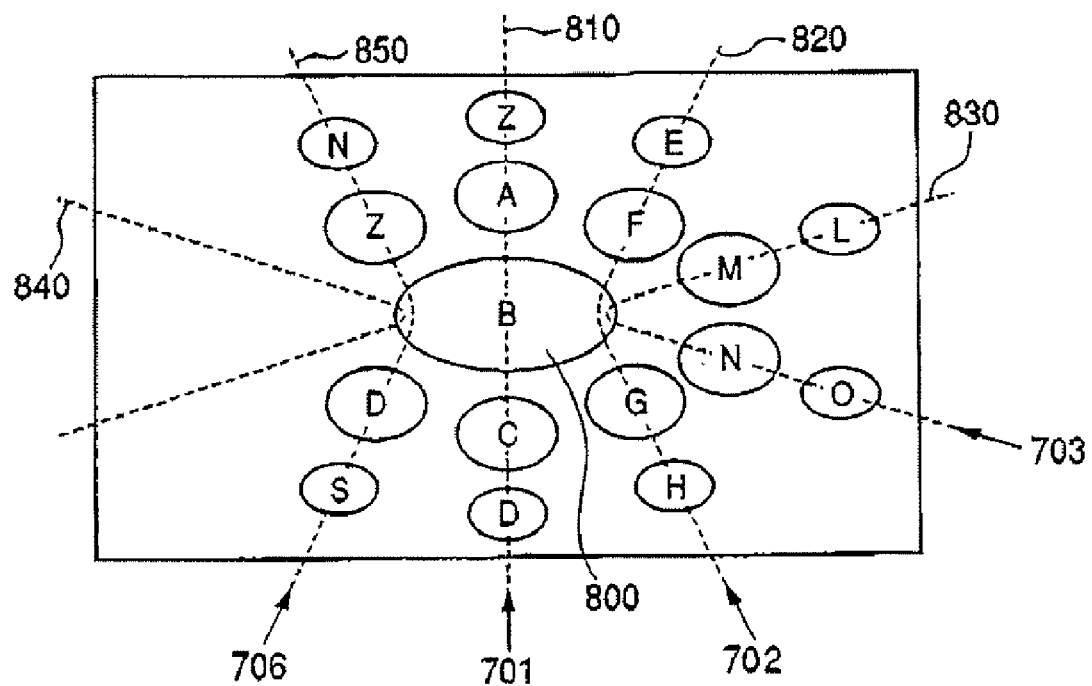

Next, a description will be given for a display mode of items of information on the display device 105 in accordance with this embodiment. FIGS. 8A and 8B are diagrams showing examples of display modes for items of information selectively displayed on the display device 105 in this embodiment. In FIGS. 8A and 8B, an item of information that is displayed larger than the other surrounding items and is also displayed in the center is specified information 800. A relation criterion corresponding to any one of the information packages, including an item of information selected as the specified information 800, is selected as a selected relation criterion.

Other items of information related to the specified information 800 by the selected relation criterion are displayed as being aligned on a selection axis 810. For example, items of information Y, Z, B and C, which are aligned on the selection axis 810 in FIG. 8A, are two previous and two subsequent items of information centered around information A, which is the specified information 800. The items Y, Z, B and C are stored in an order in the information package 701 (FIG. 7) corresponding to the selected relation criterion with respect to the specified information 800 (for example, an order in which items of information having close similarity in contents with regard to the relevant relation criterion). The items of information z and B adjacent to the information A are displayed larger than the items of information Y and C. Also, in the disclosed embodiment, of the items of information aligned on the selection axis 810, the items of information located three or more elements away from the specified information 800 in their storage positions in an information package corresponding to the selected relation criterion are not displayed on the display device 105. However, these items of information may be displayed without departing from the scope and/or spirit of the invention.

Other items of information relating to the specified information 800 by way of other relation criteria, other than the selected relation criterion, are displayed on non-selection axes 820 to 850 for respective relation criteria, that is, for respective information packages. For example, in FIG. 8A, items of information J, K, L and M aligned on the non-selection axis 820 are two previous and two subsequent items of information centered around the information A, which are displayed in an order in which they are stored in the information package 703 with respect to the information A, which is the specified information 800. The items of information K and L adjacent to the information A are displayed larger than the items of information J and M.

Also, where there are a plurality of information packages including an item of information selected as the specified information 800, up to four information packages maybe selected according to storage positions in an order based on an information package which is made as the selected relation criterion. The other items of information relating to the specified information 800 via the relation criteria, corresponding to the selected information packages, are displayed on the display device 105 as being aligned on the non-selection axes 820 to 850 for each relation criterion.

The number of non-selection axes 820 to 850 varies according to the number of information packages that include an item of information selected as the specified information 800. That is, information packages that include an item of information selected as the specified information 800 are searched for, and the non-selection axes 820 to 850 is set according to the number of information packages found. For example, if information A is included in three information packages 701, 703 and 705, in the event that the information A is set as the specified information 800, and a relation criterion corresponding to the information package 701 is set as the selected relation criterion, the items of information are displayed as being aligned on only two non-selection axes 820 and 850. In case that there is only one information package including an item of information selected as the specified information 800, the other items of information are displayed as being aligned on the selection axis 810 with the one information package being the selected relation criterion. No other items of information are displayed on the non-selection axes 820 to 850.

When the up direction key is actuated on the input device 104 in a condition in which FIG. 8A is displayed on the display device 105, as shown in FIG. 8B, items of information aligned on the selection axis 810 move up by one, and information B becomes the new specified information 800. Also, when the down direction key is actuated on the input device 104 in a condition in which FIG. 8A is displayed on the display device, items of information aligned on the selection axis 810 move down by one, and information Z becomes the new specified information 800.

When the information B is set as the specified information 800 by an actuation of the up direction key, a search is made to find information packages that include the information B. For example, the information B may be included in the information packages 701, 702, 703 and 706 shown in FIG. 7. At this point, as shown in FIG. 6B, the other items of information E, F, G and H, other than the information B included in the information package 702, are displayed as being aligned on the non-selection axis 820. The other items of information L, M, N and O, other than the information B included in the information package 703, are displayed as being aligned on the non-selection axis 830. Furthermore, the other items of information N, Z, D and S, other than the information B included in the information package 706, are displayed as being aligned on the non-selection axis 850.

In the event that the left or right direction keys are actuated on the input device 104, in the same way as in the first embodiment, an information package to be selected as the selected relation criterion changes according to the input. Information packages that are to become the relation criteria of the non-selection axes 820 to 850 also change with a change of the selected relation criterion. In this aspect, this embodiment is the same as the first embodiment in that the selection axis 810 and the non-selection axes 820 to 850 need only be recognized by the user, and need not be recognized by the CPU 101.

Furthermore, this embodiment is the same as the first embodiment in the aspect that, each time the specified information 800 or the selected relation criterion changes, its history is stored, and the previous display mode may be returned by an actuation of the X-button on the input device 104. This embodiment is also the same as the first embodiment in the aspect that the specified information 800 and the selected relation criterion are bookmarked in response to an actuation of the square button, and the bookmarked display mode may be restored by actuation of the triangle button. This embodiment is also the same as the first embodiment in the aspect that a process corresponding to the specified information 800 may be executed in response to an actuation of the circle button. Also, in case the specified information 800 is changed by an actuation of the X-button or the triangle button, an information package, including the same item of information as the new specified information 800, is retrieved in the same way as in the case in which the specified information 800 is changed in response to an actuation of the up or down direction keys.

Figure 9:
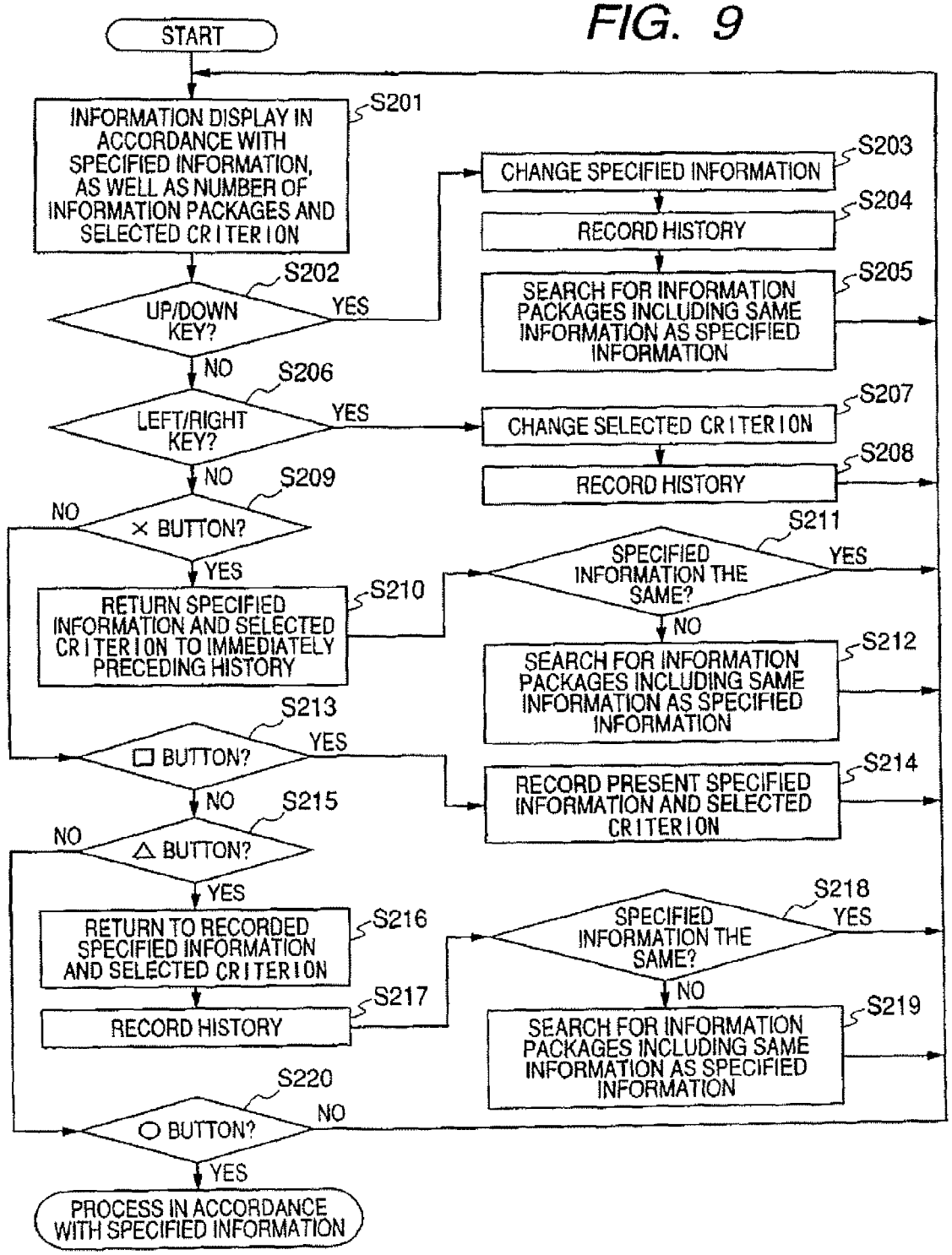
FIG. 9 is a flowchart showing a process according to the second embodiment of the invention.

Hereafter, a description will be given of an exemplary, non-limiting process executed in the information processing apparatus according to this embodiment. FIG. 9 is a flowchart showing an exemplary process in this embodiment. Although other processes, other than the process shown here, are carried out in the information processing apparatus as the skilled artisan will recognize, an exemplary, non-limiting process minimally necessary for describing the invention is shown here.

First, in the exemplary non-limiting information processing apparatus, the CPU 101 reads specified information, which is stored in the specified information area 401a in a history storage area indicated by the pointer 410 from the plurality of history storage areas 401 to 40n in the history buffer 400 provided in the main memory 102 (shown, for example, in FIG. 4A). The CPU 101 also reads a selected relation criterion (here, an information package type), which is stored in the selected criterion area 401b. Then, the CPU 101 displays information on the display device 105 in accordance with the read specified information, the information packages including this specified information, and the read selected relation criterion (step S201).

Next, the CPU 101 determines whether there is an input from the up or down direction keys of the input device 104 (step S202). If there is an input from the up or down direction keys ("Yes" at step S202), the CPU 101, in accordance with a direction input from the direction key, changes the specified information to another item of information, which is related to the present specified information 800 by the selected relation criterion, as the new specified information 800 (step S203). Next, the CPU 101 stores the changed selection condition of the specified information 800 and the selected relation criterion in a history storage area subsequent to the history storage area indicated by the pointer 410 in the history buffer 400, and moves the pointer 410 to the subsequent history storage area (step S204). The CPU 101 searches for an information package including the same information as the changed specified information 800 (step S205). Then, the CPU 101 returns to the process in step S201.

If there is no input from the up or down direction keys ("No" at step S202), the CPU 101 determines whether there is an input from the left or right direction keys of the input device 104 (step S206) If there is an input from the left or right direction keys, the CPU 101, in accordance with a direction input by the direction key, changes the selected relation criterion to another information package corresponding to the present specified information 800 (step S207). Next, the CPU 101 stores the changed selection condition of the specified information 800 and the selected relation criterion in a history storage area subsequent to the history storage area indicated by the pointer 410 in the history buffer 400, and moves the pointer 410 to the subsequent history storage area (step S208). Then, the CPU 101 returns to the process in step S201.

If there is no input from the left or right direction keys ("No" at step S206), the CPU 101 determines whether there is an input from the X-button of the input device 104 (step S209). If there is an input from the X-button ("Yes" at step S209), the CPU 101 returns the pointer 410 to a history storage area immediately previous to the history storage area indicated by the pointer 410 in the history buffer 400 provided in the main memory 102. By returning the pointer 410 to the previous history storage area, the display mode of the display device 105 is returned to the previous condition in history (stepS210).

The CPU 101 determines whether the specified information to be changed is the same as the changed specified information (step S211). If they are the same ("Yes" at step S211), the CPU 101 returns to the process in step S201. On the other hand, if the items of specified information are not the same ("No" at step S211), the CPU 101 searches for an information package including the same information as the changed specified information 800 (step S212), and returns to the process in step S201.

If there is no input from the x-button ("No" at step S209), the CPU 101 determines whether there is an input from the square button of the input device 104 (step S213). If there is an input from the square button ("Yes" at step S213), the CPU 101 stores an item of information selected as the specified information 800 at the present time in the specified information area 420a of the bookmark buffer 420 provided in the main memory 102. At the same time, the CPU 101 stores a relation criterion selected as the selected relation criterion at the present time in the selected criterion area 420b (step S214). Then, the CPU 101 returns to the process in step S201.

If there is no input from the square button ("No" at step S213), the CPU 101 determines whether there is an input from the triangle button of the input device 104 (step S215). If there is an input from the triangle button ("Yes" at step S215), the CPU 101 reads specified information stored in the specified information area 420a of the bookmark buffer 420 and a selected relation criterion stored in the selected criterion area 420b. Then, the CPU 101 makes a change to the read specified information and selected relation criterion (step S216). Next, the CPU 101 stores the changed selection condition of the specified information 800 and selected relation criterion in a history storage area subsequent to the history storage area indicated by the pointer 410 in the history buffer 400, and moves the pointer 410 to the subsequent history storage area (step S217).

The CPU 101 determines whether the specified information to be changed is the same as the changed specified information (step S218). If they are the same ("Yes" at step S218), the CPU 101 returns to the process in step S201. On the other hand, if the items of specified information are not the same ("No" at step S218), the CPU 101 searches for an information package including the same item of information as the changed specified information 800 (step S219), and returns to the process in step S201.

If there is no input from the triangle button ("No" at step S215), the CPU 101 determines whether there is an input from the circle button of the input device 104 (step S220). If there is an input from the circle button ("Yes" at step S220), the CPU 101 carries out a process according to the present specified information 800. Since the execution of a process in accordance with the specified information does not have a direct relationship to the invention, a detailed description will be omitted. If there is no input from the circle button ("No" at step S220), the CPU 101 returns to the process in step S201.

As described heretofore, in this embodiment, the items of information that may be selected to become the specified information 800 are those items of information that relate to each other via an identical relation criterion group, which together form information packages 701 to 707 for each relation criterion. In case that specified information 800 is displayed in the center of the display device 105, items of information that are displayed on the selection axis 810 and the non-selection axes 820 to 850 are displayed in an order in which items of information having close similarity in contents are adjacent to each other. The items of information are also positioned in an information package, including the same item of information as the specified information 800, such that items of information having close similarity in contents are adjacent to each other.

This embodiment is the same as the first embodiment in the aspect that the specified information 800 is sequentially changed by an input from the up or down direction keys, and the selected relation criterion is sequentially changed by an input from the left or right direction keys. Consequently, in this embodiment too, in the same way as in the first embodiment, it is possible to obtain an advantageous effect in that the user can easily reach a desired item of information by visual perception from among a plurality of items of information intricately related to each other. Furthermore, the same advantageous effect as that of the first embodiment can also be obtained in recording and bookmarking a selection condition history of the specified information 800 and selected relation criterion. Further still, the same advantageous effect as that of the first embodiment can also be obtained in that an item of information having close similarity in contents to the specified information 800 is displayed close to the specified information 800, and in that the specified information 800 is displayed largest and, of other items of information, items of information adjacent to the specified information 800 are displayed large. In other words, the size with which an item is displayed is a function of the item's similarity to the specified information 800, such that the larger the displayed item, the more similar the item is to the specified information.

Meanwhile, in this embodiment, in case the information A is set as the specified information 800 (as shown, for example, in FIG. 8A), three information packages 701, 703 and 705 are searched for as information packages including the information A (as shown, for example, in FIG. 7), thus the number of non-selection axes is two (for example, 820 and 850 in FIG. 8A). Also, in case the information B is set as the specified information 800 (as shown, for example, in FIG. 8B), four information packages 701, 702, 703 and 706 are searched for as information packages including the information B (FIG. 7), thus the number of non-selection axes is three (for example, 820, 830 and 850 in FIG. 8B). In this way, non-selection axes are provided according to a number of information packages including the specified information 800, and other items of information are displayed on respective non-selection axes for each relation criterion other than the selected relation criterion. By this means, even though the number of information packages that include the selected specified information 800 may be different, other items of information, related to the present specified information 800 by other relation criteria, other than the selected relation criterion, can be perceived for each relation criterion.

Also, in case the number of information packages including an item of information selected as the specified information 800 is one, no information is displayed on the non-selection axes 820 to 850. In this case, other items of information relating to the specified information 800, with the one information package serving as the selected relation criterion, are displayed on the selection axis 810 By this means, it becomes easier for the user to visually comprehend that specified information 800 selected at the present time is related to the other items of information by only one relation criterion.

Third Embodiment

A configuration of an information processing apparatus applied to this embodiment is also the same as that of the information processing apparatus shown in the first embodiment. In this embodiment, a configuration of information selectively displayed on the display device 105 in response to an input from the input device differs from that of the first and second embodiments. This embodiment is different in information configuration, but is the same as the second embodiment in that a number of axes on which items of information are displayed is based on specified information displayed in the center of the display device 105, which changes in accordance with the specified information.

Figure 10:
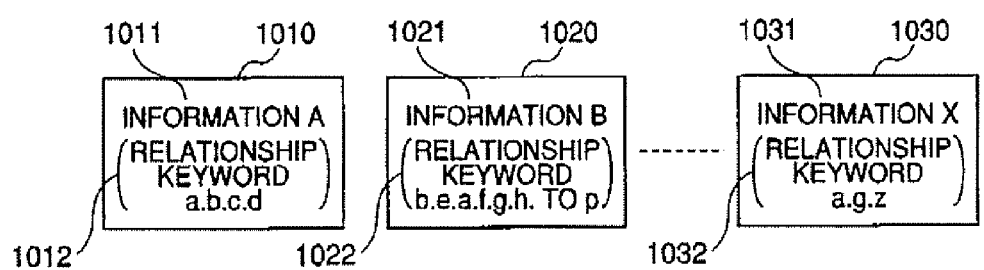
FIG. 10 is a diagram schematically showing a configuration of information selectively displayed on a display device according to a third embodiment of the invention.

FIG. 10 is a diagram schematically showing a configuration of information selectively displayed on the display device 105 in this embodiment. At this point, items of information 1010, 1020, ... and 1030 are individually stored in the HDD 103 of the information processing apparatus in FIG. 1. The items of information 1010, 1020, ... and 1030 include, in addition to information contents 1011, 1021, ... and 1031 as their respective main bodies, relationship keywords 1012, 1022, ... and 1032.

Items of information including the same keywords as the relationship keywords 1012, 1022, ... and 1032 become items of information related to each other by the same relation criterion. For example, as the items of information 1010, 1020 and 1030 all include a keyword a, they become items of information related to each other by the keyword a. Also, the items of information 1010 and 1020 include a keyword b, but the information 1030 does not include the keyword b. Consequently, the information 1010 relates to the information 1020 via the keyword b, but does not relate to the information 1030.

Figure 11:
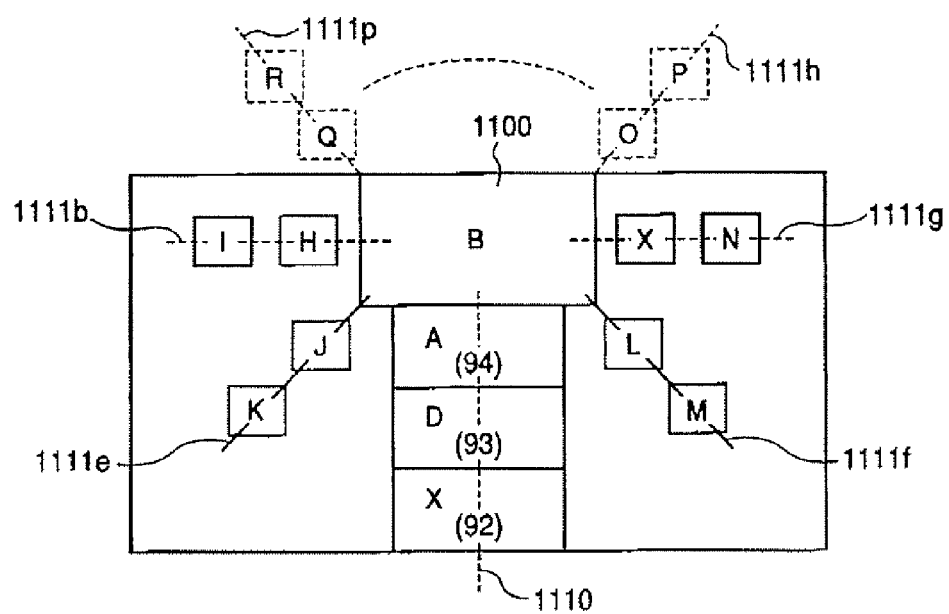
FIG. 11 is a diagram showing an example of the information selectively displayed on the display device according to the third embodiment of the invention.

Next, a description will be given of a display mode of information on the display device 105 in this embodiment. FIG. 11 is a diagram showing an example of a display mode of information selectively displayed on the display device 105 in this embodiment. In FIG. 11, information displayed large in an upper portion of the display device 105 is specified information 1100. One of relationship keywords including information selected as the specified information 1100 is selected as a selected relation criterion.

Other items of information relating to the specified information 1100 via the selected relation criterion (that is, other items of information including a keyword selected as the selected relation criterion) are displayed aligned on a selection axis 1110. In FIG. 11, items of information A, D and X are aligned on the selection axis 1110. The higher in score an item of information (such as, for example, 94, 93 and 92 for the items of information A, D and X, respectively) the closer it is displayed to the specified information 1100. The score is calculated as a function of the similarity in content of an item of information to the specified information 1100. Further, items of information (in this non-limiting example, up to three items of information whose scores have been calculated by similarity in contents to the specified information 100) are displayed in descending order on the selection axis 1110 on the display device 105. To calculate the scores, various kinds of techniques may be used, such as, for example, identicalness of words included in information, which have been conventionally used.

Other items of information relating to the specified information 1100 via other relation criteria, other than the selected relation criterion (that is, other items of information including another keyword included in the specified information 1100, other than the keyword selected as the selected relation criterion), are displayed aligned on non-selection axes for each relation criterion. The items of information aligned on the non-selection axes are displayed smaller than the items of information aligned on the selection axis 1110. On a non-selection axis 1111$b$, information H, which is higher in score calculated by similarity in information contents to the specified information 1100, is displayed closer to the specified information 1100 than information I, which is lower in the score. The same also applies to items of information aligned on non-selection axes 1111$e$ to 1111$p$.

However, in case the specified information 1100 includes six or more keywords, only two keywords before and two keywords after (in a circulating sense) a keyword selected as the selected relation criterion become relation criteria to be displayed in a display area on the display device 104. The items of information relating to the specified information 1100 via each of the relation criteria are displayed on the non-selection axes 1111$b$ to 1111$g$. Other items of information that include the other keywords are hypothetically displayed outside the display area, outside the visible field of the display 105. In case that the specified information 1100 includes only a single keyword, the keyword itself is selected as the selected relation criterion and items of information are displayed aligned on the selection axis 1110. In this case, no information is displayed on the non-selection axes 1111$b$ to 1111$p$.

For example, in FIG. 11, keywords b, e, f and g are selected as keywords corresponding to other relation criteria, other than the selected relation criterion, and displayed on the display device 105. Other items of information O and P, relating to the specified information 1100 via a keyword h, corresponding to a relation criterion that has not been selected are also aligned on the non-selection axis 1111$h$, in the same way as the items of information aligned on then on-selection axis 1111$b$. However, the items of information O and P that are aligned on the non-selection axis 1111$h$ are not displayed in the display area of the display device 105. The same also applies to other items of information Q and R, which relate to the specified information 1100 via a keyword p and are aligned on the non-selection axis 1111$p$.

In case that there is an input from the up direction key of the input device 104, items of information aligned on the selection axis 1110 move up by one, thereby changing the specified information 1100. For example, when there is an input from the up direction key in the condition in FIG. 11, the information A becomes the specified information 1100 in place of the information B. In this embodiment, as no information is displayed in an area above the specified information 1100 on the selection axis 1110, an input from the down direction key is cancelled.

Also, in case that there is an input from the left and right direction keys of the input device 104, a keyword to become the selected relation criterion is changed according to the input. For example, in case that there is an input from the left direction key in the example shown in FIG. 11, the keyword f, which is a relation criterion of the non-selection axis 1111$f$, becomes the selected relation criterion. In this case, items of information including the keyword f, besides the information B, are displayed aligned on the selection axis 1110. With this, the keyword a becomes a relation criterion other than the selected relation criterion, and a non-selection axis corresponding to the keyword a is set in a position of the non-selection axis 1111e in FIG. 11, in which items of information including the keyword a besides the information B are displayed aligned. Furthermore, positions of the non-selection axes 1111e, 1111b, 1111p, . . . 1111h and 1111g also move and, for example, the non-selection axes 1111e, 1111b, 1111h and 1111g move respectively to the positions of 1111b, 1111p, 1111g and 1111f in FIG. 11. Also in case that there is an input from the right direction key, the same applies to the case in which there is an input from the left direction key, except only that the direction of movement is inverted.

This embodiment is the same as the first embodiment in that the selection axis 1110 and the non-selection axes 1111b to 1111p need only be recognized by the user, and need not be recognized by the CPU 101. Furthermore, this embodiment is also the same as the first embodiment in that, each time the specified information 1100 or the selected relation criterion changes, the history is stored, and the previous display mode is returned by an input from the X-button of the input device 104, This embodiment is also the same as the first embodiment in that the specified information 1100 and the selected relation criterion are bookmarked by an input from the square button, and the bookmarked display mode is restored by an input from the triangle button. This embodiment is also the same as the first embodiment in that a process corresponding to the specified information 1100 is executed by an input from the circle button.

Also, in case that the specified information 1100 is changed by an input from the up direction key or an input from the X-button or the triangle button, other items of information, including another keyword, other than a keyword selected as the selected relation criterion, of keywords included in new specified information 1100, are retrieved for each relation criterion (that is, for each keyword). Then, scores of similarity in contents to the new specified information 1100 are calculated for the other items of information retrieved, and an order in which the items of information are displayed on the non-selection axes 1111b to 1111p is decided according to the calculated scores.

Figure 12:
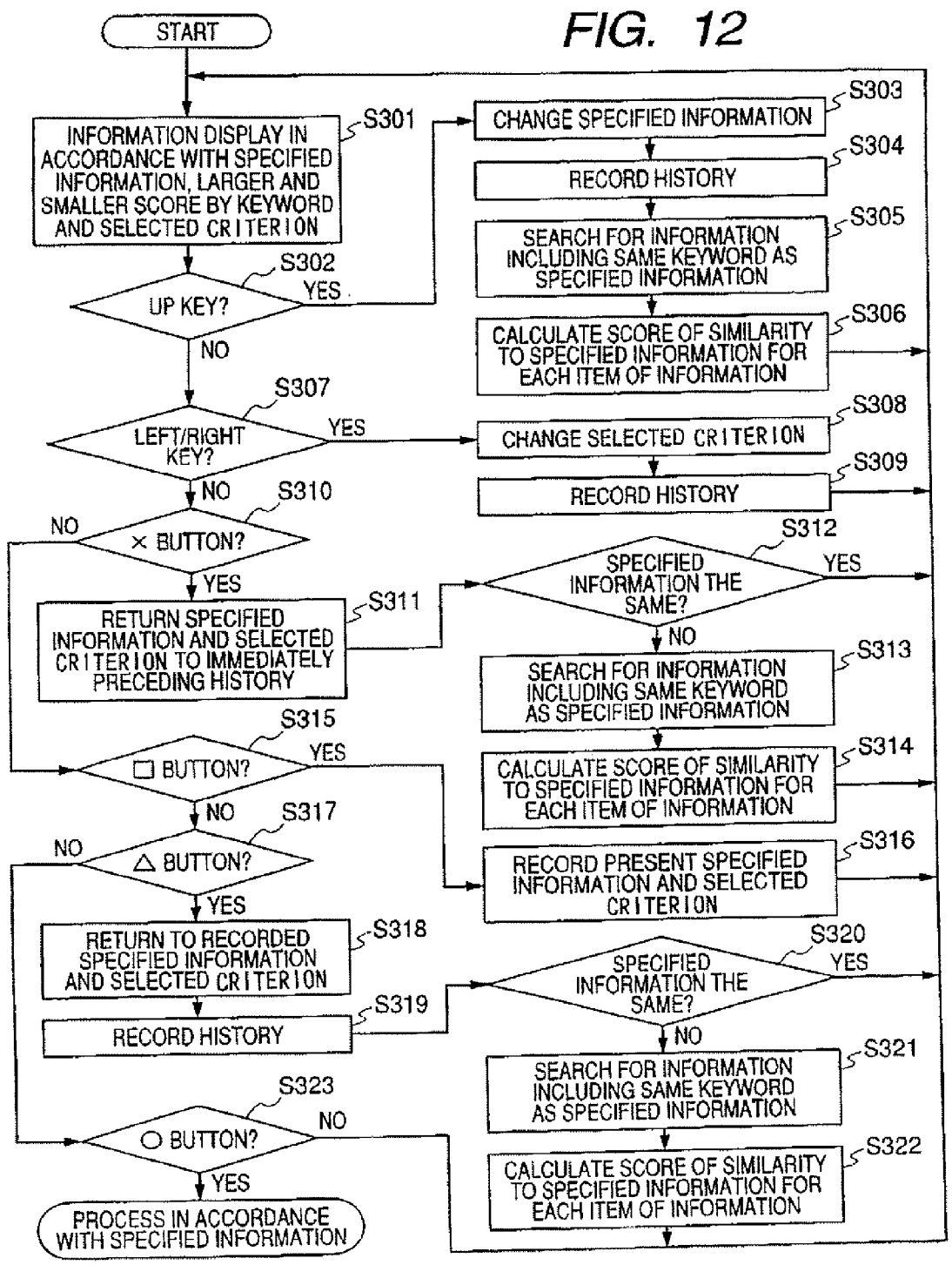
FIG. 12 is a flowchart showing a process according to the third embodiment of the invention.

Hereafter, a description will be given of a process executed in the information processing apparatus according to this embodiment. FIG. 12 is a flowchart showing the process in this embodiment. Although other processes, other than the process shown here, are carried out in the information processing apparatus as the skilled artisan will readily appreciate and recognize, an exemplary and non-limiting process minimally necessary for describing the invention will be shown here.

First, in the information processing apparatus, the CPU 101 reads specified information stored in the specified information area 401a from a history storage area indicated by the pointer 410 among a plurality of history storage areas 401 to 40n in the history buffer 400 provided in the main memory 102 (as shown, for example, in FIG. 4A). The CPU 101 also reads a selected relation criterion (here, a keyword) stored in the selection criterion area 401b. Then, the CPU 101 displays information on the display device 105 in accordance with a value of the scores of similarity in contents to the specified information and with the selected relation criterion (step S301).

Next, the CPU 101 determines whether there is an input from the up direction key of the input device 104 (step S302). If there is an input from the up direction key ("Yes" at step S302), the CPU 101, in accordance with a direction input from the direction key, changes an other item of information relating to the present specified information 1100 via the selected relation criterion to the new specified information 1100 (step S303). Next, the CPU 101 stores the changed selection condition of the specified information 1100 and the selected relation criterion in a history storage area subsequent to the history storage area indicated by the pointer 410 in the history buffer 400 (shown, for example, in FIG. 4A), and moves the pointer 410 to the subsequent history storage area (step S304). The CPU 101 searches for items of information that included the same keywords as those of the changed specified information 1100 for each of the keywords (step S305). Then, the CPU 101 calculates a score of similarity in contents to the specified information 1100 for each of the items of information searched out (step S306), and returns to the process in step S301.

If there is no input from the up direction key ("No" at step "S302), the CPU 101 determines whether there is an input from the left or right direction keys of the input device 104 (stepS307). If there is an input from the left or right direction keys ("Yes" at step S307), the CPU 101, in accordance with the direction input from the direction key, changes a keyword to serve as the selected relation criterion to another keyword included in the present specified information 1100 (stepS308). Next, the CPU 101 stores the selection condition of the specified information 1100 and the new selected relation criterion in a history storage area subsequent to the history storage area indicated by the pointer 410 in the history buffer 400, and moves the pointer 410 to the subsequent history storage area (step S309). Then, the CPU 101 returns to the process in step S301.

If there is no input from the left or right direction keys ("No" at step S307), the CPU 101 determines whether there is an input from the X-button of the input device 104 (step S310). If there is an input from the X-button ("Yes" at step S310), the CPU 101 returns the pointer 410 to a history storage area immediately previous to the history storage area indicated by the pointer 410 in the history buffer 400 provided in the main memory 102. By returning the pointer 410 to the previous history storage area, the display mode of the display device 105 is returned to the previous condition in history (step S311).

The CPU 101 determines whether the specified information to be changed is the same as the changed specified information (step S312). If they are the same ("Yes" at step S312), the CPU 101 returns to the process in step S301. On the other hand, if the items of information are not the same ("No" at step S312), the CPU 101 searches for items of information that include the same keywords as those of the changed specified information 1100, and this search is conducted for each keyword (step S313). Then, the CPU 101 calculates a score of similarity in contents to the specified information 1100 for each of the items of information found (step S314), and returns to the process of step S301.

If there is no input from the X-button ("No" at step S310), the CPU 101 determines whether there is an input from the square button of the input device 104 (step S315), If there is an input from the square button ("Yes" at step S315), the CPU 101 stores an item of information, which is selected as the specified information 1100 at the present time in the specified information area 420a, in the bookmark buffer 420 (shown, for example, in FIG. 4B) provided in the main memory 102. The CPU 101 also stores a relation criterion, which is selected as the selected relation criterion at the present time, in the selection criterion area 420b (step S316). Then, the CPU 101 returns to the process in step S301.

If there is no input from the square button ("No" at step S315), the CPU 101 determines whether there is an input from the triangle button of the input device 104 (step S317). If there is an input from the triangle button ("Yes" at step S317), the CPU 101 reads specified information stored in the specified information area 420*a* in the bookmark buffer 420 and a selected relation criterion stored in the selection criterion area 420*b*, and makes a change to the read specified information and selected relation criterion (step S318). Next, the CPU 101 stores the changed selection condition of the specified information 1100 and the selected relation criterion in a history storage area subsequent to the history storage area indicated by the pointer 410 in the history buffer 400, and moves the pointer 410 to the subsequent history storage area (step S319).

The CPU 101 determines whether the specified information to be changed is the same as the changed specified information (step S320). If they are the same ("Yes" at step S320), the CPU 101 returns to the process in step S301. On the other hand, if the items of information are not the same ("No" at step S320), the CPU 101 searches for items of information that include the same keywords as those of the changed specified information 1100, executing the search for each keyword (step S321). Then, the CPU 101 calculates a score of similarity in contents to the specified information 1100 for each of the items of information found (step S322), and returns to the process in step S301.

If there is no input from the triangle button ("No" at step S317), the CPU 101 determines whether there is an input from the circle button of the input device 104 (step S323). If there is an input from the circle button ("Yes" at step S323), the CPU 101 carries out a process according to the present specified information 1100. As this process has no direct relationship to the invention, a detailed description will be omitted. If there is no input from the circle button ("No" at step S323) the CPU 101 returns to the process in step S301.

As described heretofore, in the third embodiment, the specified information 1100 is displayed in an upper portion of the display device 105 and, of the items of information including the same keywords as those of this specified information, items of information having close similarity to the specified information 1100 are displayed close to the specified information 1100. At this point, taking the case in FIG. 11 as an example, for each of the keywords b, e, a, f, g, h, . . . and p included in the information B, which is to become the specified information 1100, items of information including the keywords are searched for. Of the keywords of the information B, which may be selected to become the specified information 1100, the keyword a is selected as the selected relation criterion, and items of information including the keyword a are displayed aligned on the selection axis 1110. The other keywords b, e, f, g, h, . . . and p are other relation criteria, other than the selected relation criterion, and items of information including these keywords are displayed aligned on the non-selection axes 1111*b* to 1111*p*.

At this point, items of information, besides the specified information 1100, including the keyword a selected as the selected relation criterion (for example, in FIG. 11, items of information A, D and X) are displayed larger than items of information, other than the specified information 1100, including the keywords b, e, f, g, h, . . . and p, which are other relation criteria, other than the selected relation criterion. Thus, it becomes easier for the user to visually perceive whether an item of information is one which can be made the new information 1100 by simply actuating the up direction key, or one which cannot be changed to the new specified information 1100 unless an input from the up direction key is carried out after an input from the left and right direction keys.

Also, among keywords included in the information B, which may be selected to become the specified information 1100, there are some keywords, such as the keyword b, for which the items of information relating to the specified information 1100 are displayed in the display area of the display device 105 as being aligned on the non-selection axis 1111*b*. On the other hand, there are some other keywords, such as the keyword p, for which items of information related to the specified information 1100 are not displayed in the display area of the display device 105 after an input from the left or right direction keys. By limiting a number of keywords for which the related items of information are displayed in this way, even though a large number of keywords may be included in the specified information 1100, a display size of other items of information, other than the specified information 1100, may be prevented from becoming too small on the display device 105. Also, even though the number of keywords for which the related items of information are displayed is limited, as long as a fixed number of items of information are displayed, the user is not greatly hindered from visually perceiving a relationship between the other items of information and the specified information 1100.

Also, the items of information that are not displayed on the display device 105 at a certain point may be displayed on the display device 105 by repeating an operation of the up, down, left and/or right direction keys of the input device 104, such as, for example, items of information having a low score of similarity in contents to the information B, which is to become the specified information 1100, or items of information including the keyword p. Thus, the user is able to visually evaluate items of information relating to the specified information 1100 even the items of information that are not displayed on the display device 105 at a certain point, so that they should be eventually displayed on the display device 105.

Also, which of the items of information including the same relationship keyword are to be displayed in a close position to the specified information 1100 is decided based upon a value of a score calculated based on similarity in contents of the items of information to contents of the specified information 1100. In this way, even among items of information including the same keyword, that is, items of information related to the specified information 1100 by the same relation criterion, by displaying items of information having a closer relationship to the specified information 1100 closer to the specified information 1100, it becomes easier for the user to visually perceive a relationship between the present specified information 1100 and other items of information.

Meanwhile, a score of similarity in contents to the specified information 1100 is calculated when an item of information, which is to become the specified information 1100, is newly set. For this reason, which of the items of information are to be displayed in a close position to the specified information 1100 on the selection axis 1110 is updated continuously, and the items of information that are optimal at any instant in time are displayed in a position easy for the user to visually evaluate.

Furthermore, this embodiment is the same as the first embodiment in that the specified information 1100 is sequentially changed by an input from the up direction key, and the selected relation criterion is sequentially changed by an input from the left or right direction keys. Consequently, in this embodiment too, in the same way as in the first embodiment, an advantageous effect can be obtained in which, from among a plurality of items of information complicatedly relating to each other, the user can easily reach a desired item of information by visual perception. Further still, regarding a history recording and a bookmarking of the selection condition of the specified information 1100 and the selected relation criterion, it is possible to obtain the same advantageous effect as that of the first embodiment.

Modified Examples of Embodiments

The invention, without being limited to the first to third embodiments, can be modified and applied in various ways. Hereafter, a description will be given of modified aspects of the first to third embodiments of the invention.

A number of items of information displayed on the selection axes 310, 810 and 1110 and the non-selection axes 320, 330, 820 to 850 and 1111b to 1111p, which have been shown in the first to third embodiments, is not limited to the number shown in each embodiment and, as long as it includes the items of specified information 300, 800, 1100 and at least one of the items of information relating to the items of specified information 300, 800, 1100 via each of the relation criteria. Also, a number of items of information displayed aligned on the selection axes 310, 810 and 1110 and the non-selection axes 320, 330, 820 to 850 and 1111b to 1111p may be set by a user's operation of the input device 104. In this case, the user can select a display mode that is easy for the user to visually comprehend according to contents displayed on the display device 105.

Also, the number of items of information displayed on each axis may be changed by a control of the CPU 101. In this case, by controlling the CPU 101 to decide an optimum number of items of information to be displayed according to a display mode displayed on the display area or the display device 105, it becomes easier for the user to visually perceive items of information displayed on the display device 105, and to more easily carry out information selection and/or retrieval.

Also, in the first and second embodiments too, in the same way as in the third embodiment, on the display device 105, the number of items of information displayed on the selection axes 310, 810 and 1100 may be larger than the number of items of information displayed on the non-selection axes 320, 330, 820 to 850 and 1111b to 1111p. In this way, by making the number of items of information on the selection axes 310, 810 and 1110 larger than the number of items of information on the non-selection axes 320, 330, 820 to 850 and 1111b to 1111p, it becomes easier to perceive other items of information that can be selected as the new specified information 300, 800, 1100 by only an input from the up and/or down direction keys of the input device 104.

In case that three or more items of information, besides the specified information 300, 800, 1100, are displayed aligned in the same direction (for example, here, up and down are considered to be different directions) on one axis, the closer relationship to the specified information 300, 800, 1100 an item of information has, as well as it being displayed closer to the specified information 300, 800, 1100, the larger it may be displayed. For example, with regard to the items of information A, D and X aligned on the selection axis 1110 in FIG. 11, not only are they displayed close to the specified information 1100 in the order named in a descending order of similarity in contents to the specified information 1100, but they may be also displayed in a size which decreases in that order. For example, the information A can be displayed larger than the information D, and the information D can be displayed larger than the information X. With such a configuration, it becomes easier for the user to visually perceive a relationship between the specified information 300, 800, 1100 and other items of information. Thus, it also becomes easier for the user to visually comprehend how to select new specified information in order to reach a user's desired item of information from the present specified information 300, 800, 1100.

In the first to third embodiments, each time the specified information 300, 800, 1100 and/or the selected relation criterion is changed, a new selection condition of the specified information 300, 800, 1100 and selected relation criterion is stored in the history storage areas 401 to 40n. However, besides the case in which the bookmarked display mode is restored, as a past selection condition of the specified information and/or selected relation criterion can be specified even by an input history of the up, down, left and/or right direction keys from the input device 104, the input history of the up, down, left and/or right direction keys may be stored in the history storage areas 401 to 40n.

In the first to third embodiments, only one bookmark buffer 420 is provided in the main memory 102, but a plurality of bookmark buffers may be provided. In this case, a bookmark buffer may be preferably configured of a ring buffer including a plurality of bookmark areas, and each of the bookmark areas includes a specified information area and a selected criterion area. Then, a pointer is provided. In this case, a control executed when there is an input from the square button and the triangle button changes in the following way from that in the first to third embodiments.

When the user carries out an input from the square button of the input device 104, in a bookmark area subsequent to a bookmark area indicated by the pointer, information selected as the specified information 300, 800, 1100 at that instant in time is recorded in the specified information area. At the same time, a relation criterion selected as the selected relation criterion at that time is recorded in the selected criterion area. Then, the pointer moves to the subsequent bookmark area.

When the user actuates the triangle button of the input device 104, the specified information recorded in the specified information area of the bookmark area indicated by the pointer and a relation criterion recorded in the selected criterion area are read. Then, the bookmarked display mode is restored, and the read-out specified information and relation criterion are recorded as a new selection condition of the specified information 300, 800, 1100 and the selected relation criterion in the history storage area. With this, the pointer of the bookmark buffer is returned to the previous bookmark area. Accordingly, when there are two successive inputs from the triangle button, the display mode corresponding to the specified information and the selected relation criterion bookmarked the time before last is restored. In case that the plurality of bookmark areas are provided in this way, not only an input to return the pointer (for example, here, an input by the triangle button), but also an input to advance the pointer may be provided.

In the first to third embodiments, at the time of actuation of the square button of the input device 104, in the event that there is data registered in the bookmark buffer 420 by an operation of the square button prior to an operation of the square button at this time, the data registered by the input from the square button at this time is overwritten. However, the invention is not limited to this configuration, and the user may be inquired as to whether to overwrite data. In this case, in case that there is already data registered in the bookmark buffer 420 at the time of an input from the square button, a screen, in which one of "overwrite data as it is?" (bookmark present display mode), "display past bookmark?" (bookmark present display mode) and "do not overwrite" may be selected by an input from the circle button, and may be preferably displayed on the display device 105, there by enabling a selection by a user's decision.

With such a configuration, even when bookmarking a newly intriguing selection condition of the specified information 300, 800, 1100 and selected relation criterion by an input from the square button, it becomes possible for the user to confirm a selection condition of the specified information and the selected relation criterion about which the user became curious at a certain point in the past. Thus, the situation where a selection condition of the specified information and the selected relation criterion, which should have been bookmarked, cannot be restored without being noticed, thereby it becomes easier for the user to select a desired item of information.

In the first to third embodiments, a difference between items of information displayed on the display device 105 can be evaluated by changing a display size and a display position, but the invention is not limited to this configuration. For example, items of information, which are displayed in positions more distant from the specified information 300, 800, 1100, maybe more suppressed in pictorial aspects such as, for example, a color, a tone and a resolution. In case that moving information such as an animation is applied as display information, it is also acceptable to configure the information display and selection in such a way that information displayed in a position more distant from the specified information 300, 800, 1100 is more slowly reproduced. Otherwise, it is also acceptable to configure the display and selection in such a way that items of information other than the specified information 300, 800, 1100 are stationary. It is also acceptable to configure the display and selection in such a way that a setting of a display condition of these items of information can be switched by a user's operation. In this case, it becomes possible for the user to select items of information in a desired display condition, and it becomes easier to select a desired item of information.

In the first to third embodiments, any of the specified information, other items of information relating to the specified information via the selected relation criterion, and other items of information relating to the specified information via other relation criteria, other than the selected relation criterion, are constantly displayed on the display device 105. However, only an item of information selected as the specified information at the present time may be displayed on the display device 105, while other items of information may be displayed on the display device 105 as necessary.

Figure 13A:
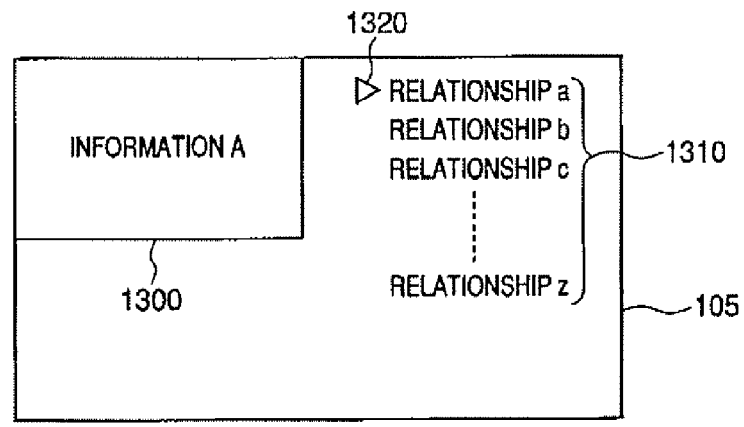
FIGS. 13A to 13C are diagrams showing modified examples of the display mode of the information selectively displayed on the display device.
Figure 13B:
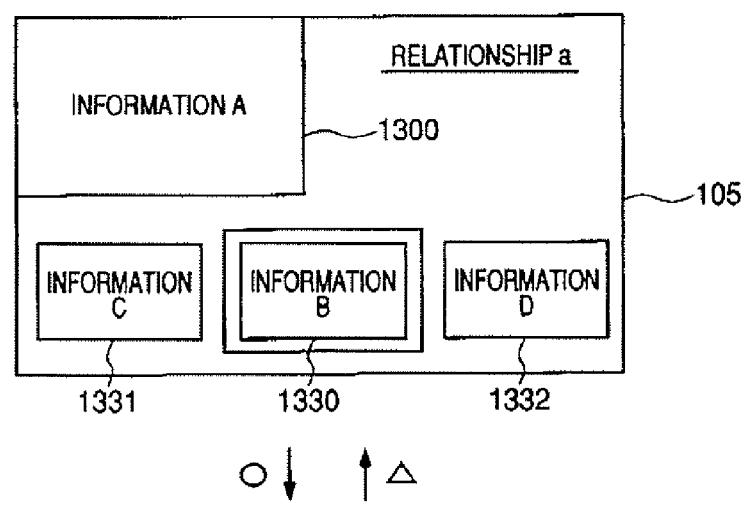
Figure 13C:
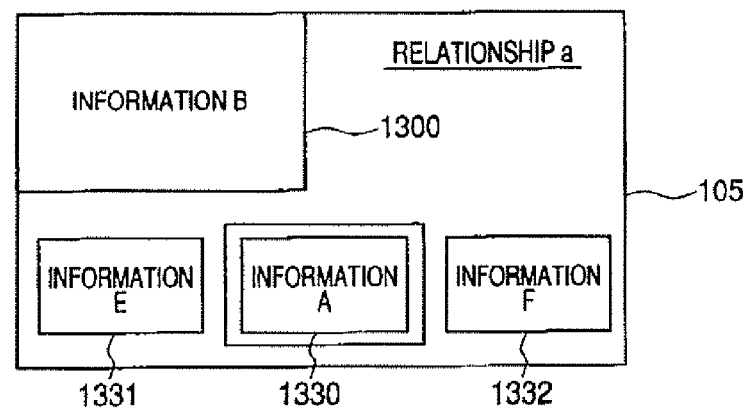

FIGS. 13A to 13C are diagrams showing modified examples of a display mode of information selectively displayed on the display device 105. As shown in FIG. 13A, specified information 1300 (here, information A) and a relation criterion 1310 (here, for example, a relationship a to a relationship z), which relates the information A servings as the specified information 1300 to other items of information, are displayed on the display device 105. By operating the up or down direction keys of the input device 104 and moving a cursor 1320, any relation criterion can be selected from among the relationship a to the relationship z. In the example shown in FIG. 13A, an input from the left or right direction keys is cancelled.

When, for example, an input from the circle button of the input device 104 is carried out in the non-limiting example of FIG. 13A, as shown in FIG. 13B, with the information A remaining displayed as the specified information 1300, items of information B, C and D, relating to the information A via the relationship a, are displayed as items of information 1330 to 1332 relating to the specified information 1300. The information 1330 in the center is information to be selected next as the specified information 1300 in response to an input from the circle button of the input device 104.

When the left or right direction keys of the input device 104 are operated in the non-limiting example of FIG. 13B, the information contents of the information 1330, which is to be selected next as the specified information, and the items of information 1331 and 1332 adjacent to the information 1330 are changed in accordance with the input. For example, when an input is carried out from the right direction key, the information 1330 to be selected next as the specified information is changed to the information C. When, for example, an input from the X-button of the input device 104 is carried out in the example of FIG. 13B, the information display mode of the display device 105 can be returned to the exemplary non-limiting display configuration shown in FIG. 13A.

When an input from the circle button of the input device 104 is carried out in the exemplary configuration of FIG. 13B, as shown in FIG. 13C, the information B serving as the information 1330 is changed to the specified information 1300, and the information A serving as the specified information 1300 is changed to the information 1330 to be selected next as the specified information. Also, the information contents of the items of information 1331 and 1332 may also be changed along with this change. When, for example, an input from the triangle button of the input device 104 is carried out in the condition of FIG. 13C, the information display mode of the display device 105 can be returned to the condition shown in FIG. 13B. Also, when, for example, an input from the X-button of the input device 104 is carried out in the example shown in FIG. 13C, the specified information 1300 (here, for example, the information B) and the relation criterion 1310 (here, for example, the relation criterion which relates the information B to other items of information), which are same as those shown in FIG. 13A, are displayed on the display device 105.

In the first to third embodiments, items of information to be displayed on the display device 105 are stored in advance in the HDD 103. However, items of information to be displayed on the display device 105 may be, for example, an electronic program guide (EPG), which are stored in a server device existing on the Internet, a local area network (LAN), a wide area network (WAN), or the like, and wherein the various components are coupled wirelessly or through wired configurations, as the skilled artisan will readily recognize. Also, the items of information may be stored dispersed on a plurality of server devices. At this point, in the third embodiment, they can be stored dispersed for each of the items of information 1010, 1020, . . . and 1030 but, in the second embodiment, they can be stored dispersed for each of the information packages 701 to 707.

Also, when searching for information as in the second and third embodiments, information indicating the changed specified information 800, 1100 may be transmitted from the communication device 106 to the server device on the Internet using a function included in the server device, each time the specified information 800, 1100 is changed, and other items of information to be displayed (which, in the third embodiment, also include items of information lying outside the display area) may be received from the server device. When only the selected relation criterion changes, as no change occurs in the type of the information to be displayed, it is not necessary to receive information from the server device.

In the case that information existing on the internet is applied as the information to be displayed in this way, information that can be displayed on the display device 105 may be limited for each information processing apparatus or for each user. In this case, the information that can be displayed may be limited by the information processing apparatus, or it may be limited by the server device. In this case, display information to be displayed on the display device 105 may be limited by a user's age, a presence or absence of registration in a system, or the like.

In the first to third embodiments, the specified information 300, 800, 1100 is sequentially changed by an operation of the input device 104. However, explanation has not been made as to which information is first selected as the specified information 300, 800, 1100. The first specified information 300, 800, 1100 may be appropriately selected in the information processing apparatus, or may be selected in accordance with a user's instruction depending upon a configuration of the information to be displayed on the display device 105. In order to select the first specified information, for example, it is possible to use the electronic program guide.

Figures 14A, 14B:
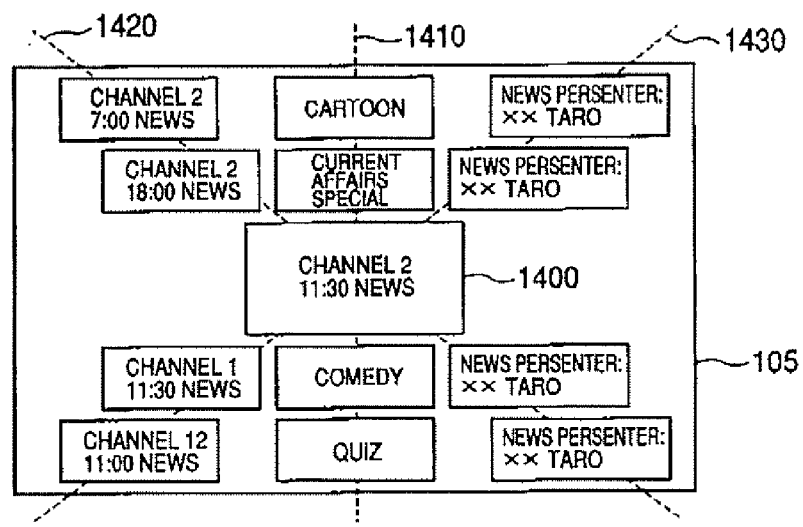
FIGS. 14A and 14B are diagrams showing an example of an electronic program guide and an example of a display mode of information displayed on the display device in accordance with specified information selected first in accordance with the electronic program guide.

FIG. 14A is a diagram showing an example of the electronic program guide. As shown in the figure, in the electronic program guide, channels are set on its horizontal axis and hours are set on its vertical axis, and programs are displayed in a list format on a per channel and hour basis. In order to select the first specified information in accordance with the electronic program guide, first, the electronic program guide is displayed on the display device 105.

In the electronic program guide, the channel is changed by operating the left or right direction keys of the input device 104, and the hour is changed by operating the up or down direction keys. For example, in the non-limiting example shown in FIG. 14A, 11:30 news on channel 2 is selected (for example, shown in the figure by the shaded area). At this point, when the left direction key is operated, 11:30 news on channel 1 is selected and, when the up direction key is operated, a 10:30 current affairs special on channel 2 is selected. For example, when the user operates the circle button of the input device 104, the selected program becomes the first specified information.

FIG. 14B is a diagram showing an example of a display mode of information on the display device 105 in a case in which the 11:30 news on channel 2 is set as the first specified information. In this case, the 11:30 news on channel 2 is displayed in the center of the display device 105 as specified information 1400. Also, other programs relating to each other via the same relationship of the channel 2 are displayed aligned on a selection axis 1410. Other programs relating to each other via the same relationship of news are displayed aligned on a selection axis 1420. Other programs relating to each other via the same relationship of a news presenter XX Taro are displayed aligned on a selection axis 1430.

With such a configuration, from among items of information displayed in a list (here, individual programs), a desired item of information is selected as an item of information to become the first specified information, it becomes possible to more easily reach a user's desired item of information.

In the first to third embodiments, information relating to items of information is not displayed on the display device 105, but information as to which relation criterion is made the selected relation criterion with respect to the specified information 300, 800, 1100 may be displayed. Also, the number of items of information relating to the specified information 300, 800, 1100 via the relevant selected relation criterion maybe displayed. In this case, the user can change the display condition while noting the number of items of information aligned on the selection axis 310, 810, 1110.

In the first to third embodiments, the four keys, that is, up, down, left and right keys are provided as the direction input keys of the input device 104. However, a component device of the input device 104 necessary for carrying out a direction input is not limited to this configuration, As long as a key, like a direction key, is provided for giving an instruction to make a transition of the specified information 300, 800, 1100 or the selected relation criterion, a joystick, a mouse, a track ball or the like may be applied. Also, information that is to become the specified information 300, 800, 1100 may be directly indicated through devices such as, for example a touch panel, a biometrics device, or the like. The input device 104 may not necessarily be included in a main body of the information processing apparatus, but may instead be a remote device such as, for example a remote controller, or the like.

In the first to third embodiments, information selectively displayed on the display device 105 and a program executed by the CPU 101 are stored in the HDD 103, but the invention is not limited to this configuration. The information and the program may be downloaded from a server device via a network through the communication device 106 and stored in the main memory 102. Also, it is possible to provide an information processing apparatus having the information and the program stored in advance in the main memory 102. In addition, it is possible to distribute the information and the program by various methods according to hardware applied as a platform.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments maybe utilized and derived from the disclosure, such that structural and logical substitutions and changes may be made without departing from the scope and spirit of the disclosure. Additionally, the illustrations are merely representational and are not drawn to scale. Certain proportions within the illustrations maybe exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

An Abstract of the Disclosure is provided to comply with 37 C.F.R. §1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. An information browsing apparatus that allows a user to browse for information by sequentially displaying, on a display, information selected from among a plurality of items of information, the plurality of items of information stored in a memory, the information browsing apparatus comprising:
   an input that receives, from a user, an information selection instruction, a relation criterion selection instruction, and a relevant item selection instruction;
   a starting specified information processor that selects, from the memory, one of the plurality of items of information as specified information for starting information browsing;
   a specified information displayer that displays, on the display, the specified information, the specified information defining at least one relation criterion of a plurality of relation criteria, the at least one relation criterion relating to the specified information;
   an information processor that selects, from the memory and in accordance with the information selection instruction received by the input, another one of the plurality of items of information;
   a relation criterion processor that selects, in accordance with the relation criterion selection instruction received by the input, a selected relation criterion from among the at least one relation criterion that relates to the specified information;
   a relevant information displayer that displays, on the display, items of specified relevant information from among the plurality of items of information in response to the relation criterion processor selecting the selected relation criterion, the items of specified relevant information relating to the specified information via the selected relation criterion, at least one of the items of specified relevant information being newly displayed on the display to facilitate further browsing;
   a specified relevant information processor that selects, in accordance with the relevant item selection instruction received by the input, one of the items of specified relevant information; and
   a continuation specified information processor that sets the one of the items of specified relevant information selected by the specified relevant information processor as the specified information to be displayed on the display for further browsing,
   wherein each of the plurality of items of information relate to at least one other of the plurality of items of information via at least one of the plurality of relation criteria, and
   wherein, when the relation criterion processor selects the selected relation criterion and when the relevant information displayer displays the items of specified relevant information, the specified information remains set as the specified information.

2. The information browsing apparatus according to claim 1, further comprising:
   a list displayer that displays, on the display, a list of items of information, from among the plurality of items of information, which may be set as the specified information for starting information browsing; and
   a listed information processor that selects, in accordance with a list selection instruction received by the input, a desired item of information from the list of items of information displayed by the list displayer, wherein
   the starting specified information processor selects the desired item of information selected by the listed information processor as the specified information.

3. The information browsing apparatus according to claim 1, wherein
   the plurality of items of information include items of information with which other items of information are related via only one of the plurality of relation criteria; and
   the relation criterion processor,
   when at least two of the plurality of relation criteria relate to the specified information displayed by the specified information displayer, selects one of the at least two of the plurality of relation criteria as the selected relation criterion in response to the relation criterion selection instruction, and,
   when one of the plurality of relation criteria relates to the specified information displayed by the specified information displayer, selects the one of the plurality of relation criteria as the selected relation criterion regardless of the relation criterion selection instruction.

4. The information browsing apparatus according to claim 1, further comprising:
   a history storage that stores, in a history memory, a setting history of the specified information and a selection history of the selected relation criterion; and
   a history condition restorer that causes the display to display a historical item of information, from among the plurality of items of information stored in the setting history, in response to a user history instruction to restore a history condition.

5. The information browsing apparatus according to claim 1, further comprising:
   a selection processor that, when it is determined that the information selection instruction is received, carries out a process set according to the specified information selected in accordance with the information selection instruction.

6. The information browsing apparatus according to claim 1, further comprising:
   an information extracting processor that extracts, from the memory, an extracted item of information from among the plurality of items of information, each of the plurality of items of information including a plurality of individual items of information corresponding to different respective ones of the plurality of relation criteria, wherein
   the relevant information displayer causes the information processor to extract one of the plurality of items of information in which only the plurality of individual items of information corresponding to the selected relation criterion differ from one another, and causes the display to display the extracted one of the plurality of items of information as one of the items of specified relevant information.

7. The information browsing apparatus according to claim 1, further comprising:
an information searching processor that searches an information storage that stores relation criterion information sets, each of which is a set of items of information related to each other via different respective ones of the plurality of relation criteria, for one of the relation criterion information sets, wherein
the relevant information displayer causes the information searching processor to search for one of the relation criterion information sets corresponding to the selected relation criterion, and causes the display to display, from among items of information included in the one of the relation criterion information sets, an item of information other than the specified information as one of the items of specified relevant information.

8. The information browsing apparatus according to claim 1, further comprising:
an information searching processor that searches an information storage that stores the plurality of items of information, each of which includes relation criterion information for specifying a relation criterion that relates the corresponding one of the plurality of items of information to other items of information including the same relation criterion information, wherein
the relevant information displayer causes the information searching processor to search for items of information, including relation criterion information corresponding to the selected relation criterion, and causes the display to display, from among the searched items of information, an item of information other than the specified information as one of the items of specified relevant information.

9. The information browsing apparatus according to claim 1, wherein the relevant information displayer causes the display to display the specified information and the items of specified relevant information in an order according to a relationship of the items of specified relevant information to the specified information.

10. The information browsing apparatus according to claim 1, wherein
the specified information displayer causes the display to display the specified information in a specified position, and
the relevant information displayer causes the display to display the items of specified relevant information in a position set based upon the specified position.

11. The information browsing apparatus according to claim 10, wherein the relevant information displayer causes the items of specified relevant information to be displayed on the display smaller than the specified information.

12. The information browsing apparatus according to claim 1, wherein the relevant information displayer causes the display to display, from among the items of specified relevant information, a predetermined number of items of information.

13. The information browsing apparatus according to claim 1, further comprising:
a non-specified relevant information displayer that displays, on the display, from among the plurality of items of information, items of non-specified relevant information that relate to the specified information via one of the plurality of relation criteria other than the selected relation criterion in a position different from a display position of the items of specified relevant information.

14. An information browsing method executed in a computer, including an input for inputting user instructions, a display for displaying information and a storage for storing data, the method allowing a user to browse for information by sequentially displaying information selected from among a plurality of items of information, the method comprising:
setting one of the plurality of items of information as specified information for starting information browsing, the specified information defining at least one relation criterion of a plurality of relation criteria, the at least one relation criterion relating to the specified information;
storing data indicating the specified information in the storage;
displaying the specified information based on the data indicating the specified information;
determining whether an information selection instruction that selects another one of the plurality of items is received from the input;
determining whether a relation criterion instruction that selects a selected relation criterion from among the at least one relation criterion that relates to the specified information is received from the input;
displaying, on the display, from among the plurality of items of information, items of specified relevant information that relate to the specified information via the selected relation criterion in response to determining that the relation criterion selection has been received from the input, at least one of the items of specified relevant information being newly displayed on the display for facilitating further browsing;
determining whether a relevant item selection instruction that selects one of the items of specified relevant information is received from the input;
newly setting the one of the items of specified relevant information as the specified information in response to determining that the relevant item selection instruction has been received from the input for further information browsing;
updating the data, stored in the storage, that indicates the specified information, the updating being based on the newly set one of the items of specified relevant information; and
storing the updated data in the storage,
wherein each of the plurality of items of information relate to at least one other of the plurality of items of information via at least one of the plurality of relation criteria, and
wherein, when determining whether the relation criterion instruction is received and when displaying the items of specified relevant information, the specified information remains set as the specified information.

15. A non-transitory computer readable recording medium embodying a program that is to be executed in a computer, including an input for inputting user instructions, a display for displaying information and a storage for storing data, the embodied program allowing a user to browse information by sequentially displaying information selected from among a plurality of items of information, the program causing the computer to execute:
setting one of the plurality of items of information as specified information for starting information browsing, the specified information defining at least one relation criterion of a plurality of relation criteria, the at least one relation criterion relating to the specified information;

storing data indicating the specified information in the storage;

displaying the specified information on the display based on the data indicating the specified information stored in the storage;

determining whether an information selection instruction that selects another one of the plurality of items is received from the input;

determining whether a relation criterion instruction that selects a selected relation criterion from among the at least one relation criterion that relates to the specified information is received from the input;

displaying, on the display, from among the plurality of items of information, items of specified relevant information that relate to the specified information via the selected relation criterion in response to determining that the relation criterion selection has been received from the input, at least one of the items of specified relevant information being newly displayed on the display for facilitating further browsing;

determining whether a relevant item selection instruction that selects one of the items of specified relevant information is received from the input;

newly setting the one of the items of specified relevant information as the specified information in response to determining that the relevant item selection instruction has been received from the input for further information browsing;

updating the data, stored in the storage, that indicates the specified information, the updating being based on the newly set one of the items of specified relevant information; and storing the updated data in the storage, wherein each of the plurality of items of information relate to at least one other of the plurality of items of information via at least one of the plurality of relation criteria, and wherein, when determining whether the relation criterion instruction is received and when displaying the items of specified relevant information, the specified information remains set as the specified information.

* * * * *